US010356823B2

(12) United States Patent
Islam et al.

(10) Patent No.: US 10,356,823 B2
(45) Date of Patent: Jul. 16, 2019

(54) RANDOM ACCESS MESSAGE TRANSMISSION USING MULTIPLE SYMBOLS

(71) Applicant: QUALCOMM Incorporated, San Diego, CA (US)

(72) Inventors: Muhammad Nazmul Islam, Edison, NJ (US); Juergen Cezanne, Ocean Township, NJ (US); Sundar Subramanian, Bridgewater, NJ (US); Bilal Sadiq, Basking Ridge, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 15/357,951

(22) Filed: Nov. 21, 2016

(65) Prior Publication Data

US 2017/0290056 A1    Oct. 5, 2017

Related U.S. Application Data

(60) Provisional application No. 62/317,445, filed on Apr. 1, 2016.

(51) Int. Cl.
*H04L 27/26* (2006.01)
*H04W 72/04* (2009.01)
*H04W 74/08* (2009.01)

(52) U.S. Cl.
CPC ....... *H04W 74/085* (2013.01); *H04L 27/2607* (2013.01); *H04W 72/0446* (2013.01); *H04W 72/0453* (2013.01)

(58) Field of Classification Search
CPC .............. H04W 74/0833; H04W 56/001
See application file for complete search history.

(56) References Cited

U.S. PATENT DOCUMENTS 6,567,482 B1   5/2003 Popovic'
6,574,212 B1 * 6/2003 Jurgensen .............. H04B 7/216
                                                    370/337
(Continued)

FOREIGN PATENT DOCUMENTS

EP    2866512 A1    4/2015
WO    WO-9960729 A1   11/1999
(Continued)

OTHER PUBLICATIONS

ISA/EP, International Search Report and Written Opinion of the International Searching Authority, Int'l Application No. PCT/US2017/020972, dated May 19, 2017, European Patent Office, Rijswijk, NL, 14 pgs.

(Continued)

*Primary Examiner* — Ayaz R Sheikh
*Assistant Examiner* — Debebe A Asefa
(74) *Attorney, Agent, or Firm* — Holland & Hart LLP; Clint R. Morin

(57) ABSTRACT

A user equipment (UE) may transmit a random access message to a wireless node using multiple symbols. The random access message may include repetitions of a random access sequence weighted by a spreading code. For example, a random access sequence may be weighted using different elements of the spreading code, where a first repetition may be weighted with a first element and a second repetition may be weighted using a second element. The weighted random access signals may be spread over multiple symbols and transmitted to the wireless node as the random access message. In some cases, a spreading code may include values of one and negative one, may be based on rows of a Hadamard matrix, or may correspond to a number of symbols used to transmit the random access message.

47 Claims, 17 Drawing Sheets

(56) References Cited

U.S. PATENT DOCUMENTS

| | | | |
|---|---|---|---|
| 6,985,474 B2 | 1/2006 | Dahlman et al. | |
| 8,856,628 B2 | 10/2014 | Lakkis | |
| 2011/0164587 A1* | 7/2011 | Seo | H04L 1/1671 370/329 |
| 2012/0314664 A1* | 12/2012 | Johansson | H04W 74/0833 370/329 |
| 2013/0170456 A1 | 7/2013 | Novak et al. | |
| 2015/0373740 A1 | 12/2015 | Eriksson et al. | |

FOREIGN PATENT DOCUMENTS

| | | |
|---|---|---|
| WO | WO-0239622 A1 | 5/2002 |
| WO | WO-2015147717 A1 | 10/2015 |

OTHER PUBLICATIONS

QUALCOMM Incorporated, "Reciprocity vs Non-Reciprocity in Initial Access/RACH," 3GPP TSG RAN WG1 Meeting #87, R1-1612037, Reno, Nevada, USA, Nov. 14-18, 2016, 10 pgs., XP051190270, 3rd Generation Partnership Project.

Zte et al., "WF on RACH Association," 3GPP TSG RAN WG1 Meeting #88, R1-1703630, Athens, Greece, Feb. 13-17, 2017, 7 pgs., XP051236551, 3rd Generation Partnership Project.

\* cited by examiner

RANDOM ACCESS MESSAGE TRANSMISSION USING MULTIPLE SYMBOLS

CROSS REFERENCES

The present application for patent claims priority to U.S. Provisional Patent Application No. 62/317,445 by Islam, et al., entitled "Random Access Message Transmission Using Multiple Symbols," filed Apr. 1, 2016, assigned to the assignee hereof, and hereby expressly incorporated by reference herein in its entirety.

BACKGROUND

The following relates generally to wireless communication, and more specifically to random access message transmission using multiple symbols.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some wireless communications systems, UEs may use random access procedures when attempting to communicate with a network. A UE may send a random access message to a base station to enable the base station to identify the UE's request for communication resources. However, multiple UEs may simultaneously attempt to connect to the network, and each UE may transmit its own random access message. These multiple random access messages may collide with each other and prevent the base station from determining the UEs that are requesting communication resources, resulting in inefficient access procedures and communication delays.

SUMMARY

A user equipment (UE) may transmit a random access message to a wireless node using multiple symbols. The random access message may include repetitions of a random access sequence weighted by a spreading code. For example, a random access sequence may be weighted using different elements of the spreading code, where a first repetition may be weighted with a first element and a second repetition may be weighted using a second element. The weighted random access signals may be spread over multiple symbols and transmitted to the wireless node as the random access message. In some cases, a spreading code may include values of one and negative one, may be based on rows of a Hadamard matrix, or may correspond to a number of symbols used to transmit the random access message.

A method of wireless communication is described. The method may include identifying a random access sequence and a spreading code, generating a random access message comprising a plurality of repetitions of the random access sequence weighted using different elements of the spreading code and spread over a plurality of symbols, and transmitting the random access message to a wireless node.

An apparatus for wireless communication is described. The apparatus may include means for identifying a random access sequence and a spreading code, means for generating a random access message comprising a plurality of repetitions of the random access sequence weighted using different elements of the spreading code and spread over a plurality of symbols, and means for transmitting the random access message to a wireless node.

Another apparatus for wireless communication is described. The apparatus may include a processor, memory in electronic communication with the processor, and instructions stored in the memory. The instructions may be operable to cause the processor to identify a random access sequence and a spreading code, generate a random access message comprising a plurality of repetitions of the random access sequence weighted using different elements of the spreading code and spread over a plurality of symbols, and transmit the random access message to a wireless node.

A non-transitory computer readable medium for wireless communication is described. The non-transitory computer-readable medium may include instructions operable to cause a processor to identify a random access sequence and a spreading code, generate a random access message comprising a plurality of repetitions of the random access sequence weighted using different elements of the spreading code and spread over a plurality of symbols, and transmit the random access message to a wireless node.

In some examples of the method, apparatus, and non-transitory computer-readable medium described above, generating the random access message comprises: including a first repetition of the random access sequence and a second repetition of the random access sequence. Some examples of the method, apparatus, and non-transitory computer-readable medium described above may further include processes, features, means, or instructions for weighting the first repetition of the random access sequence using a first element of the spreading code.

Some examples of the method, apparatus, and non-transitory computer-readable medium described above may further include processes, features, means, or instructions for weighting the second repetition of the random access sequence using a second element of the spreading code. In some examples of the method, apparatus, and non-transitory computer-readable medium described above, the first element of the spreading code and the second element of the spreading code may be a value of one. In some examples of the method, apparatus, and non-transitory computer-readable medium described above, the first element of the spreading code may be a value of one and the second element of the spreading code may be a value of negative one.

In some examples of the method, apparatus, and non-transitory computer-readable medium described above, each element of the spreading code comprises a value of one or a value of negative one. In some examples of the method, apparatus, and non-transitory computer-readable medium described above, generating the random access message comprises: applying a randomly selected row of a Hadamard matrix as the spreading code. In some examples of the method, apparatus, and non-transitory computer-readable medium described above, a length of the spreading code corresponds to a number of symbols used to transmit the random access message.

Some examples of the method, apparatus, and non-transitory computer-readable medium described above may further include processes, features, means, or instructions for receiving a synchronization subframe from the wireless node, wherein the synchronization subframe comprises a directional transmission. Some examples of the method, apparatus, and non-transitory computer-readable medium described above may further include processes, features, means, or instructions for identifying a frequency resource, a time resource, or both based at least in part on the received synchronization subframe, wherein the random access message may be transmitted using the frequency resource, the time resource, or both.

Some examples of the method, apparatus, and non-transitory computer-readable medium described above may further include processes, features, means, or instructions for establishing a wireless connection with the wireless node based at least in part on the random access message. In some examples of the method, apparatus, and non-transitory computer-readable medium described above, transmitting the random access message comprises: transmitting the random access message using one or more randomly selected subcarriers of a radio frequency spectrum band.

In some examples of the method, apparatus, and non-transitory computer-readable medium described above, transmitting the random access message comprises: transmitting the random access message using one or more randomly selected component carriers. In some examples of the method, apparatus, and non-transitory computer-readable medium described above, the random access message comprises a cyclic prefix based on a delay spread and a round trip time. In some examples of the method, apparatus, and non-transitory computer-readable medium described above, the random access sequence comprises a randomly selected cyclic shift of a predetermined access sequence.

A method of wireless communication is described. The method may include receiving a random access message from a UE, the random access message comprises a plurality of repetitions of a random access sequence weighted using different elements of a spreading code and spread over a plurality of symbols, identifying the random access sequence and the spreading code based at least in part on the random access message, and identifying the UE based at least in part on the random access sequence and the spreading code.

An apparatus for wireless communication is described. The apparatus may include means for receiving a random access message from a UE, the random access message comprises a plurality of repetitions of a random access sequence weighted using different elements of a spreading code and spread over a plurality of symbols, means for identifying the random access sequence and the spreading code based at least in part on the random access message, and means for identifying the UE based at least in part on the random access sequence and the spreading code.

Another apparatus for wireless communication is described. The apparatus may include a processor, memory in electronic communication with the processor, and instructions stored in the memory. The instructions may be operable to cause the processor to receive a random access message from a UE, the random access message comprises a plurality of repetitions of a random access sequence weighted using different elements of a spreading code and spread over a plurality of symbols, identify the random access sequence and the spreading code based at least in part on the random access message, and identify the UE based at least in part on the random access sequence and the spreading code.

A non-transitory computer readable medium for wireless communication is described. The non-transitory computer-readable medium may include instructions operable to cause a processor to receive a random access message from a UE, the random access message comprises a plurality of repetitions of a random access sequence weighted using different elements of a spreading code and spread over a plurality of symbols, identify the random access sequence and the spreading code based at least in part on the random access message, and identify the UE based at least in part on the random access sequence and the spreading code.

In some examples of the method, apparatus, and non-transitory computer-readable medium described above, receiving the random access message comprises: receiving a first repetition of the random access sequence and a second repetition of the random access sequence. In some examples of the method, apparatus, and non-transitory computer-readable medium described above, the first repetition of the random access sequence may be weighted using a first element of the spreading code and the second repetition of the random access sequence may be weighted using a second element of the spreading code.

In some examples of the method, apparatus, and non-transitory computer-readable medium described above, the first element of the spreading code and the second element of the spreading code may be a value of one. In some examples of the method, apparatus, and non-transitory computer-readable medium described above, the first element of the spreading code may be a value of one and the second element of the spreading code may be a value of negative one. In some examples of the method, apparatus, and non-transitory computer-readable medium described above, the spreading code comprises a randomly selected row of a Hadamard matrix.

In some examples of the method, apparatus, and non-transitory computer-readable medium described above, a length of the spreading code corresponds to a number of symbols used to transmit the random access message. Some examples of the method, apparatus, and non-transitory computer-readable medium described above may further include processes, features, means, or instructions for transmitting a synchronization subframe using a directional transmission, wherein the random access message may be transmitted based at least in part on the synchronization subframe.

In some examples of the method, apparatus, and non-transitory computer-readable medium described above, the synchronization subframe may be transmitted using a millimeter wave (mmW) frequency band. Some examples of the method, apparatus, and non-transitory computer-readable medium described above may further include processes, features, means, or instructions for establishing a wireless connection with the UE based at least in part on the random access message.

Some examples of the method, apparatus, and non-transitory computer-readable medium described above may further include processes, features, means, or instructions for receiving a second random access message from a second UE, wherein the second random access message comprises repetitions of the random access sequence weighted using elements of a second spreading code different from the spreading code. Some examples of the method, apparatus, and non-transitory computer-readable medium described above may further include processes, features, means, or instructions for distinguishing the UE and the second UE based at least in part on the spreading code being different from the second spreading code.

DETAILED DESCRIPTION

User equipments (UEs) may use random access procedures to establish a connection and communicate with a network. For example, a UE may determine that it has data to send and may use random access procedures to initiate a data transfer with a wireless node, such as a base station or another UE. In some cases, one or more UEs may seek resources to send data and subsequently transmit a random access message including a random access sequence or preamble to the wireless node. In some cases, subframes designated for random access messages may use symbols that are relatively longer than the symbols in data subframes. This symbol length may be applied to random access subframes but may not be applied to other types of subframes, which may result in complex implementation in a wireless system.

A coherent tone spacing and symbol duration across different types of subframes (e.g., both data subframes and random access subframes) may result in more efficient implementation. In such cases, a random access sequence may be repeated over multiple symbols of random access subframes. This technique may increase a signal-to-noise ratio (SNR) of random access message reception to meet link budget parameters. In some cases, a number of allowed cyclic shifts used by multiple UEs attempting to access the network may also be limited, thus limiting the number of UEs that may attempt to simultaneously connect to a base station.

A UE may transmit a random access message that includes multiple random access sequences that are spread over multiple symbols using different spreading codes. Through the use of the spreading codes, more UEs may send random access messages to the wireless node while avoiding different symbol lengths for random access subframes, resulting in improved implementation and reduced collisions by various UEs. For example, a random access sequence may be weighted with a spreading code to produce repetitions of a same or modified sequence transmitted in multiple symbols. This may allow a base station to distinguish between a greater number of different UEs that transmitted random access messages.

Aspects of the disclosure introduced above are further described below in the context of a wireless communication system. Examples are then provided of multiple UEs transmitting random access messages using a spreading code applied to a random access sequence. Aspects of the disclosure are further illustrated by and described with reference to apparatus diagrams, system diagrams, and flowcharts that relate to random access message transmission using multiple symbols.

Figure 1:
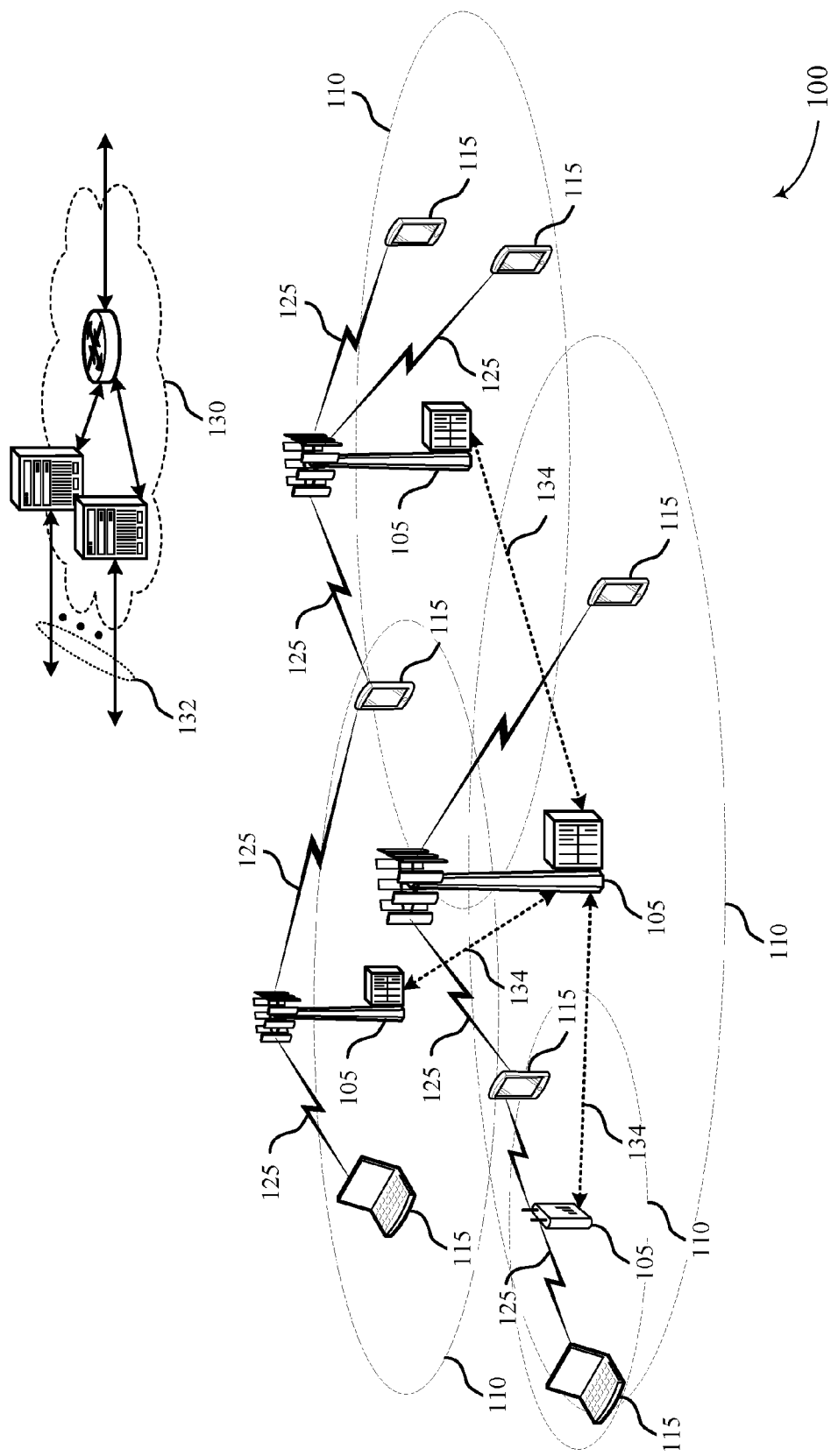
FIG. 1 illustrates an example of a wireless communications system that supports random access message transmission using multiple symbols in accordance with aspects of the present disclosure.

FIG. 1 illustrates an example of a wireless communications system 100 that supports random access message transmission using multiple symbols in accordance with various aspects of the present disclosure. The wireless communications system 100 includes base stations 105, UEs 115, and a core network 130. Wireless communications system 100 may support repetitions of random access sequences in multiple symbols for efficient random access procedures.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc. In some cases, base stations 105 or UEs 115 may be examples of wireless nodes. For example, a UE 115 may serve as a wireless node in a communications system that supports device-to-device (D2D) communications.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A UE 115 may be configured to collaboratively communicate with multiple base stations 105 through, for example, multiple-input multiple-output (MIMO), coordinated multipoint (CoMP), or other schemes. MIMO techniques use multiple antennas on the base stations 105 or multiple antennas on the UE 115 to take advantage of multipath environments to transmit multiple data streams. CoMP includes techniques for dynamic coordination of transmission and reception by a number of base stations 105 to improve overall transmission quality for UEs 115 as well as increasing network and spectrum utilization.

Wireless communications system 100 may operate in an ultra-high frequency (UHF) region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum.

Wireless communication system 100 may operate in mmW frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

UEs 115 may use random access procedures to establish a connection and communicate with a network. For example, a UE 115 may determine that it has data to send and use random access procedures to initiate a data transfer with a base station 105. In some cases, one or more UEs 115 may seek resources to send data and subsequently transmit a random access sequence or preamble to the base station 105. The base station 105 may detect the random access sequence transmissions from the one or more UEs 115 and assign resources for communication.

A random access message transmission may be based on a synchronization signal received from a base station 105. For example, the transmission of synchronization symbols from a base station 105 may be used by a UE 115 to identify timing and/or frequency resources to send the random access message. In some mmW systems, such as wireless communications system 100, synchronization signals may be beamformed, where a base station 105 may use multiple antenna ports connected to subarrays of antennas to form beams in various directions using a number of analog weight factors. The base station 105 may thus transmit the synchronization symbol in multiple directions, where the direction may change in each symbol of a synchronization subframe.

In some cases, subframes designated for random access messages may use symbols that are relatively longer than the symbols in data subframes to meet a link budget (e.g., an accounting of gains and losses associated with transmitters and receivers when communicating over a medium). Some wireless communications systems may extend the duration of random access symbols through fractional tone spacing, where the symbol duration may also change with the tone spacing based on an inversely proportional relationship. For example, a tone spacing may be reduced from 15 kHz to 1.25 kHz corresponding to a symbol duration change from 66.67 μs to 800 μs. The different tone spacing may only be applied to random access subframes, which may result in complex implementation in a wireless system.

A coherent tone spacing and symbol duration across different types of subframes (e.g., both data subframes and random access subframes) may result in more efficient implementation. For example, the same tone spacing, and thus the same symbol duration, may be used across different subframes. In such cases, a random access sequence may be repeated over multiple symbols of random access subframes. This technique may increase a SNR of random access message reception to meet link budget parameters.

In some cases, a number of cyclic shifts applied to a random access sequence may be used by UEs 115 attempting to access the network may be limited. For example, if multiple UEs 115 attempt to transmit a random access message simultaneously, the messages may collide and impede a base station's ability to determine the UEs 115 that are attempting to communicate. As a result, the UEs 115 may use different cyclic shifts applied to a root sequence to avoid collisions. However, to account for a delay spread and different timing for each UE 115, the number of cyclic shifts may be less than the ratio of the random access symbol duration and a cyclic prefix (CP) duration. Consequently, a number of available degrees of freedom for random access message transmissions may be limited, thus limiting the number of UEs 115 that may attempt to simultaneously connect.

In an example, multiple UEs 115 may each transmit a random access message using two symbols, and the illustrative values found in Table 1 may be used to determine the number of degrees of freedom for a wireless communications system based on various durations, where $T_S$ is a sample period.

TABLE 1

| Preamble Configuration | $T_{GP1}$ | $T_{CP}$ | $T_{SEQ}$ | $N_{SYM}$ | $T_{GP2} = T_{RTT}$ |
|---|---|---|---|---|---|
| 0 | 3136 * $T_S$ | (512 + 144) * $T_S$ | 2048 * $T_S$ | 10 | 512 * $T_S$ |

In the values found in Table 1, a random access symbol duration ($T_{SEQ}$) is equal to 2048*$T_S$ and a CP duration ($T_{CP}$) is equal to 656*$T_S$. In such cases, the ratio of $T_{SEQ}$ and $T_{CP}$ may illustrate that the total degrees of freedom for cyclic shifts may be no more than three. Thus, three different cyclic shifts may be used for random access resources, and three different UEs 115 may be able to simultaneously send a random access message using the different cyclic shifts while avoiding collisions.

In wireless communications system 100, a UE 115 may transmit a random access message to a wireless node (e.g., a base station 105) using multiple symbols. The random access message may include repetitions of a random access sequence weighted by a spreading code. For example, a random access sequence may be weighted using different elements of the spreading code, where a first repetition may be weighted with a first element and a second repetition may be weighted using a second element. The weighted random access signals may be spread over multiple symbols and transmitted to the wireless node as the random access message (e.g., as part of a random access preamble). In some cases, a spreading code may include values of one and negative one, may be based on rows of a Hadamard matrix, or may correspond to a number of symbols used to transmit the random access message.

Figure 2:
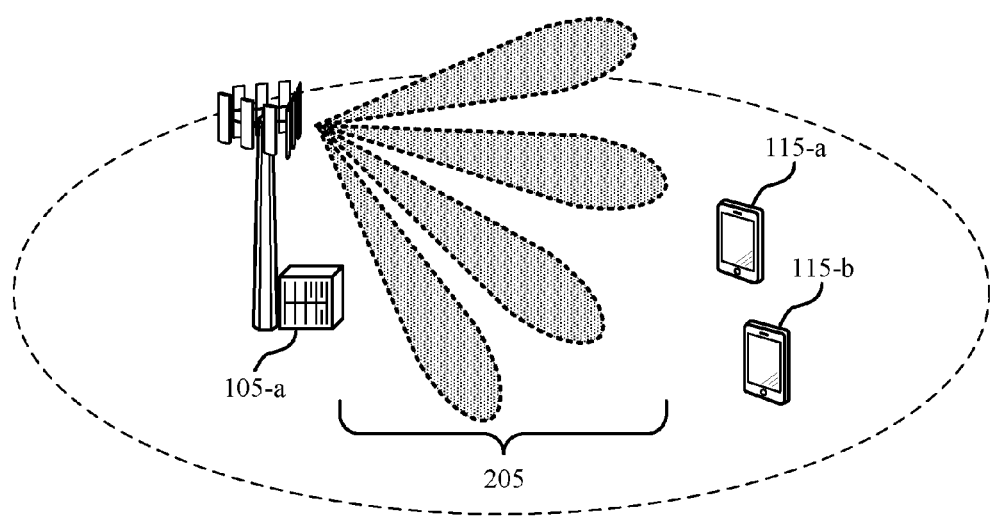
FIG. 2 illustrates an example of a wireless communications system that supports random access message transmission using multiple symbols in accordance with aspects of the present disclosure.

FIG. 2 illustrates an example of a wireless communications system 200 that supports random access message transmission using multiple symbols. Wireless communications system 200 may include base station 105-a and UE 115-a, which may be examples of the corresponding devices described with reference to FIG. 1. Wireless communications system 200 may support the transmission of random access sequences in multiple symbols, where the random access sequences are weighted by a spreading code to avoid collisions by multiple UEs 115.

In wireless communications system 200, a UE 115 (e.g., UE 115-a and UE 115-b) may transmit a random access message that includes multiple random access sequences (e.g., random access preamble sequences) that are spread over multiple symbols using different spreading codes. For example, the spreading code may be based on a Hadamard matrix (or some other sequence). Through the use of the spreading code, the number of degrees of freedom in the system may increase. That is, more UEs 115 may be able to send random access messages to base station 105-a while avoiding collisions.

In some cases, the number of degrees of freedom may be increased by allowing multiple UEs 115 to transmit random access messages using different sets of subcarriers and symbol pairs. For example, additional degrees of freedom may be achieved through the use of two symbols of one subcarrier, where a random access sequence may be weighted by different elements of a spreading code in each symbol.

In an example, the additional degrees of freedom for cyclic shifts may be found using the illustrative values found in Table 2. When multiple UEs 115 transmit a random access sequence in a time period that lasts for two symbols, six different cyclic shifts for random access resources may be available. That is, the ratio of the random access symbol duration ($T_{SEQ}$) and the CP duration ($T_{CP}$) (4096/(512+144)=6, in this example) may allow up to six different cyclic shifts. Additional degrees of freedom for cyclic shifts may be achieved using fractional spacing, as compared to non-fractional tone spacing.

TABLE 2

| Preamble Configuration | $T_{GP1}$ | $T_{CP}$ | $T_{SEQ}$ | $N_{SYM}$ | $T_{GP2} = T_{RTT}$ |
|---|---|---|---|---|---|
| 0 | 1600 * $T_S$ | (512 + 144) * $T_S$ | 4096 * $T_S$ | 6 | 512 * $T_S$ |

A random access message transmission may be based on synchronization signals 205 received from base station 105-a. For example, the transmission of synchronization signals 205 from base station 105-a may be used by UE 115-a and UE 115-b to identify timing and/or frequency resources to send a random access message. In wireless communications system 200 (which may represent an example of a mmW system), synchronization signals 205 may be beam-formed. Base station 105-a may use multiple antenna ports connected to subarrays of antennas to form beams in various directions using a number of analog weight factors. Base station 105-a may thus transmit the synchronization signals 205 in multiple directions, where the direction may change in each symbol of a synchronization subframe.

In some cases, a UE 115 may identify a specific beam associated with the synchronization signals 205 (e.g., a beam with the highest SNR) and further identify a symbol during which that beam was transmitted. The UE 115 may then select a number of symbols to transmit a random access message based on the symbol associated with the identified beam. For example, UE 115-a may determine that a synchronization beam (e.g., a beam that includes one or more synchronization signals) was transmitted during a first symbol, and UE 115-a may correspondingly transmit the random access message during the first two symbols of a random access subframe. UE 115-b may identify another synchronization beam and transmit a random access message during different symbols of a random access subframe. If both UE 115-a and UE 115-b identify the same synchronization beam (e.g., transmitted during the same symbol) the UEs 115 may attempt to transmit the random access message using the same resources. However, when using a random access sequence weighted by the spreading code, collisions may be avoided, and base station 105-a may differentiate between the UEs 115 and proceed to assign resources to both UE 115-a and UE 115-b. Additionally or alternatively, a UE 115 may randomly select a subcarrier of a radio frequency spectrum band or randomly select a component carrier to transmit the random access message.

Different random access sequences may be generated by modifying a random access sequence by the spreading code. For example, each element of the spreading code may include a value of +1 or −1. When the random access sequence is weighted with this spreading code, a first and second sequence may differ from each other when transmitted in multiple symbols, allowing base station 105 to distinguish between random access messages transmitted by UEs 115-a and UE 115-b.

In some cases the spreading code may modify the spreading sequence based on a UE grouping scheme. For example, one group of UEs 115, e.g., including UE 115-a, may multiply a random access sequence using a spreading code of [+1, +1] and transmit the resulting signal using two symbols of a subframe. Another group of UEs 115, e.g., including UE 115-b, may modify a random access sequence using the spreading code of [+1, −1] and transmit the resulting signals using two symbols of a subframe. UE 115-a and UE 115-b may transmit a random access message simultaneously and base station 105-a may identify and distinguish UE 115-a and UE 115-b by the received random access message. Additional degrees of freedom for cyclic shifts may be based on a number of symbols occupied by a random access sequence. In some cases, each UE 115 may select a spreading sequence based on a randomly selected row of a Hadamard matrix.

Figure 3:
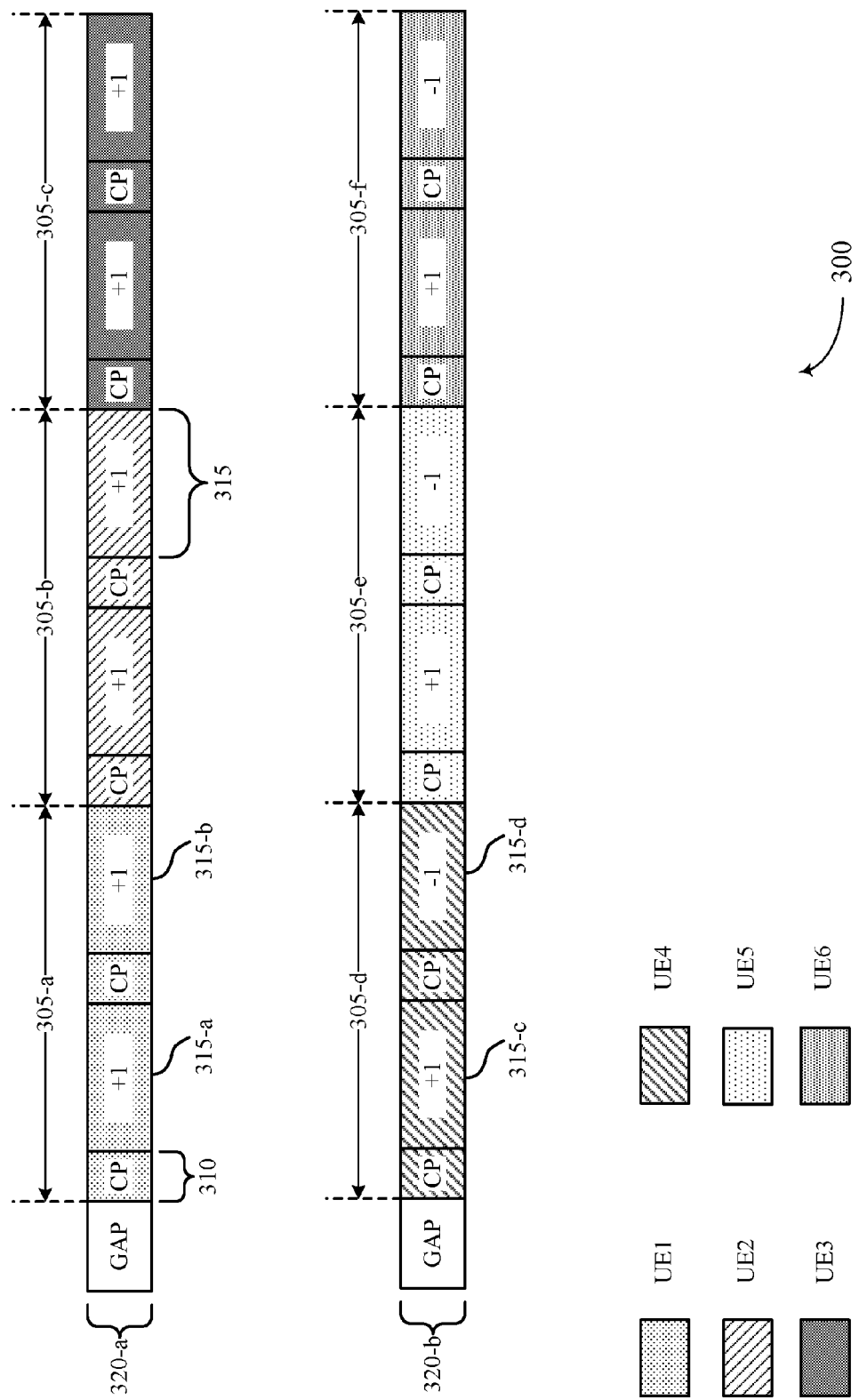
FIG. 3 illustrates an example of random access message transmissions in a system that supports random access message transmission using multiple symbols in accordance with aspects of the present disclosure.

FIG. 3 illustrates an example of random access message transmissions 300 in a system that supports random access message transmissions using multiple symbols. In some cases, random access message transmissions 300 may represent aspects of techniques performed by a UE 115 or base station 105 as described with reference to FIGS. 1-2. Random access message transmissions 300 may provide an example of groups of UEs 115 transmitting random access sequences weighted by a spreading code.

Random access transmission may include multiple random access messages 305 (e.g., including random access preambles mapped to one or more resources) that are associated with (and generated by) multiple UEs 115. For example, a first random access message 305-a may be associated with a first UE 115, a second random access message 305-b may be associated with a second UE 115, and so on. Each random access message 305 may include multiple CPs 310, where each CP 310 may be used to mitigate delay spread and round trip time for multiple UEs 115 transmitting the random access messages 305. In some cases, CP 310 may be relatively longer than a CP in a data subframe or message.

Each random access message 305 may include multiple symbols 315 that are used to transmit random access sequences. For example, a first UE 115 may transmit first random access message 305-*a* with a repetition of a random access sequence over two symbols 315. In some cases, the random access sequence may be weighted using different elements of a spreading code, and the resulting code may be spread across multiple symbols. The elements of the spreading code may include a value of a one or a negative one. Additionally or alternatively, the elements of the spreading code may be based on a randomly selected row of a Hadamard matrix.

As an example, random access message 305-*a* may include a symbol 315-*a* and a symbol 315-*b*. Symbol 315-*a* and symbol 315-*b* may be generated from a random access sequence weighted by a spreading code with elements having values of one. That is, symbol 315-*a* may be weighted with a first element of the spreading code that has a value of one, and symbol 315-*b* may also be weighted using a second element of the spreading code with a value of one. Thus, the elements of the spreading code applied to the random access sequence in random access message 305-*a* may be represented as [+1, +1], and both symbol 315-*a* and symbol 315-*b* may be repetitions of the same random access sequence.

Different UEs 115 may use random access sequences weighted with different elements of a spreading code. For example, another UE 115 may generate a random access message 305-*d* that has a random access sequence weighted differently than random access message 305-*a*. In random access message 305-*d*, symbol 315-*c* may be weighted with a first element of a spreading code with a value of one, and symbol 315-*d* may be weighted with a second element of a spreading code with a value of negative one. Accordingly, the elements of the spreading code applied to the random access sequence in random access message 305-*d* may be represented as [+1, −1]. Thus, symbol 315-*c* and symbol 315-*d* may be repetitions of a weighted random access sequence that are different from the repetitions of the random access sequence in random access message 305-*a*.

In some cases, multiple UEs 115 may be grouped together, where a first UE group 320-*a* may transmit random access messages weighted using different elements of a spreading code than a second UE group 320-*b*. For example, each UE 115 in first UE group 320-*a* may transmit a random access message 305 (e.g., random access messages 305-*a*, 305-*b*, and 305-*c* corresponding to three different UEs) using the same weighting. For the UEs 115 in this group, each of the symbols 315 may include a random access sequence multiplied by spreading codes with elements of [+1, +1]. Similarly, each UE 115 in second UE group 320-*b* may transmit random access messages 305 (e.g., random access messages 305-*d*, 305-*e*, and 305-*f* corresponding to three additional UEs that are different than those in first UE group 320-*a*) using a different weighting. These random access messages 305 may include random access sequences weighted by spreading codes with elements of [+1, −1]. Thus, a base station 105 may correlate the random access messages 305 with the [+1, +1] and [+1, −1] weighting according to the two different UE groups 320. Additionally, the base station 105 may differentiate between each UE 115 within the UE groups 320 that are transmitting the random access messages 305.

Figure 4:
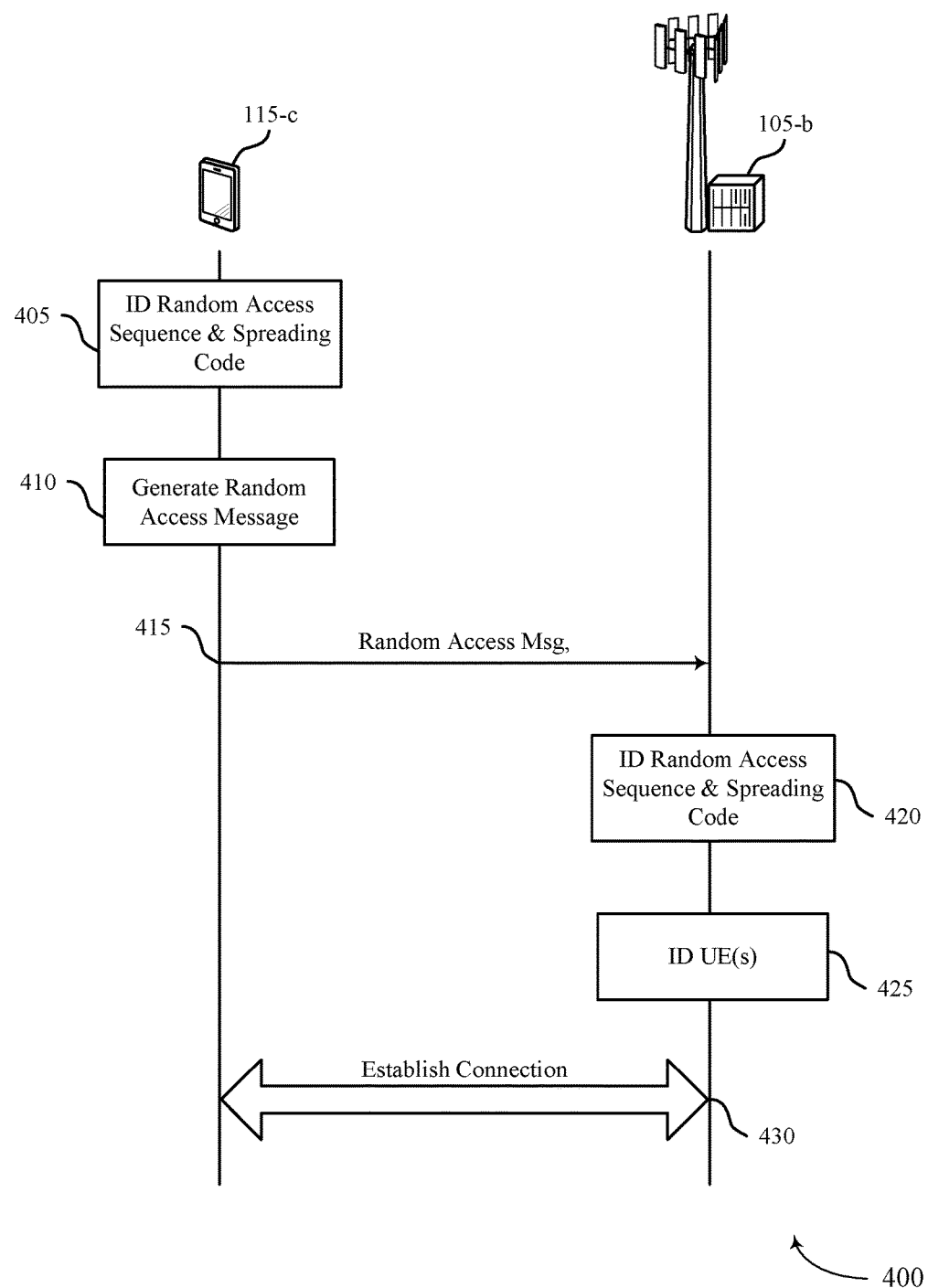
FIG. 4 illustrates an example of a process flow in a system that supports random access message transmission using multiple symbols in accordance with aspects of the present disclosure.

FIG. 4 illustrates an example of a process flow 400 in a system that supports random access message transmission using multiple symbols in accordance with various aspects of the present disclosure. Process flow 400 may include a wireless node, such as base station 105-*a*, and UE 115-*a*, which may be examples of the corresponding devices described with reference to FIG. 1-3.

At step 405, UE 115-*c* may identify a random access sequence and a spreading code and, at step 410, UE 115-*c* may generate a random access message including multiple repetitions of the random access sequence weighted using different elements of the spreading code and spread over a plurality of symbols. In some cases, the random access sequence includes a randomly selected cyclic shift of a predetermined access sequence. In some cases, each element of the spreading code includes a value of one or a value of negative one. A length of the spreading code may also correspond to a number of symbols used to transmit a random access message.

When generating the random access message, UE 115-*b* may include a first repetition of the random access sequence and a second repetition of the random access sequence. In some cases, UE 115-*c* may generate the random access message by weighting the first repetition of the random access sequence using a first element of the spreading code and weighting the second repetition of the random access sequence using a second element of the spreading code. The first element and second elements of the spreading code may be a value of one, or the first element may be a value of one and the second element may be a value of negative one. Additionally or alternatively, UE 115-*c* may generate the random access message by applying a randomly selected row of a Hadamard matrix as the spreading code.

At step 415, UE 115-*c* may transmit the random access message to base station 105-*b*. In some cases, the random access message may be transmitted using one or more randomly selected subcarriers of a radio frequency spectrum band. Additionally or alternatively, the random access message may be transmitted using one or more randomly selected component carriers. In some examples, the random access message includes a CP based on a delay spread and a round trip time.

Upon receipt of the random access message from UE 115-*c*, at step 420 base station 105-*b* may identify the random access sequence and the spreading code based on the random access message, and may subsequently identify UE 115-*c* based on the random access sequence and the spreading code at step 425. In some cases, base station 105-*b* may receive a second random access message from another UE 115 (not shown), where the second random access message includes repetitions of the random access sequence weighted using elements of a second spreading code that are different from the spreading code used by UE 115-*c*. Base station 105-*b* may thus distinguish UE 115-*c* and the other UE 115 based on the spreading codes being different for each UE 115. At step 430, UE 115-*c* may establish a wireless connection with base station 105-*b* based on the random access message.

Figure 5:
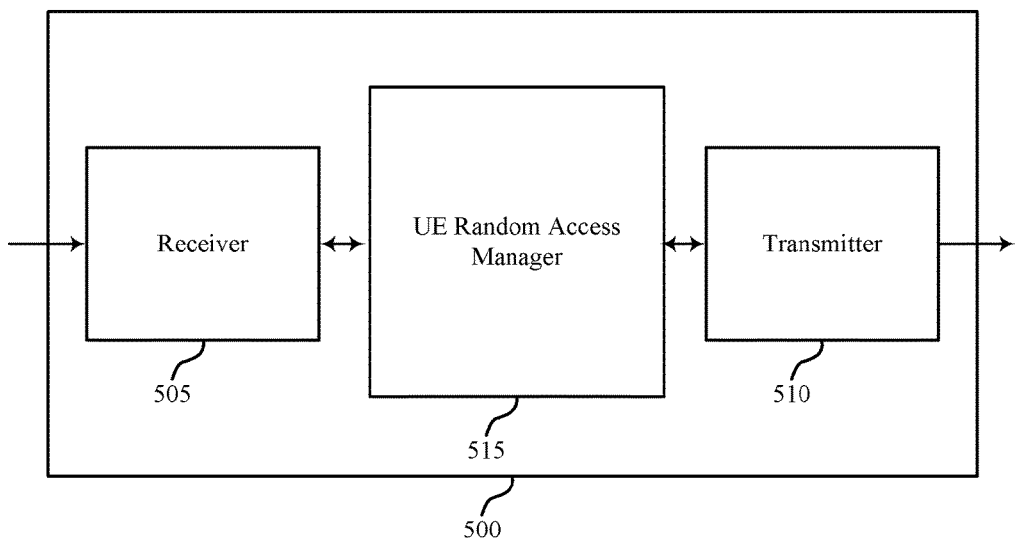
FIGS. 5 through 7 show block diagrams of a wireless device that supports random access message transmission using multiple symbols in accordance with aspects of the present disclosure.

FIG. 5 shows a block diagram of a wireless device 500 that supports random access message transmission using multiple symbols in accordance with various aspects of the present disclosure. Wireless device 500 may be an example of aspects of a UE 115 described with reference to FIGS. 1 and 2. Wireless device 500 may include receiver 505, transmitter 510, and UE random access manager 515. Wireless device 500 may also include a processor. Each of these components may be in communication with each other.

The receiver 505 may receive information such as packets, user data, or control information associated with various information channels (e.g., control channels, data channels, and information related to random access message transmission using multiple symbols, etc.). Information may be passed on to other components of the device. The receiver 505 may be an example of aspects of the transceiver 825 described with reference to FIG. 8.

The transmitter 510 may transmit signals received from other components of wireless device 500. In some examples, the transmitter 510 may be collocated with a receiver in a transceiver module. For example, the transmitter 510 may be an example of aspects of the transceiver 825 described with reference to FIG. 8. The transmitter 510 may include a single antenna, or it may include a plurality of antennas.

The UE random access manager 515 may identify a random access sequence and a spreading code and generate a random access message including a set of repetitions of the random access sequence weighted using different elements of the spreading code and spread over a set of symbols. The UE random access manager 515 may transmit the random access message to a wireless node (e.g., a base station 105 or a UE 115). The UE random access manager 515 may also be an example of aspects of the UE random access manager 805 described with reference to FIG. 8.

Figure 6:
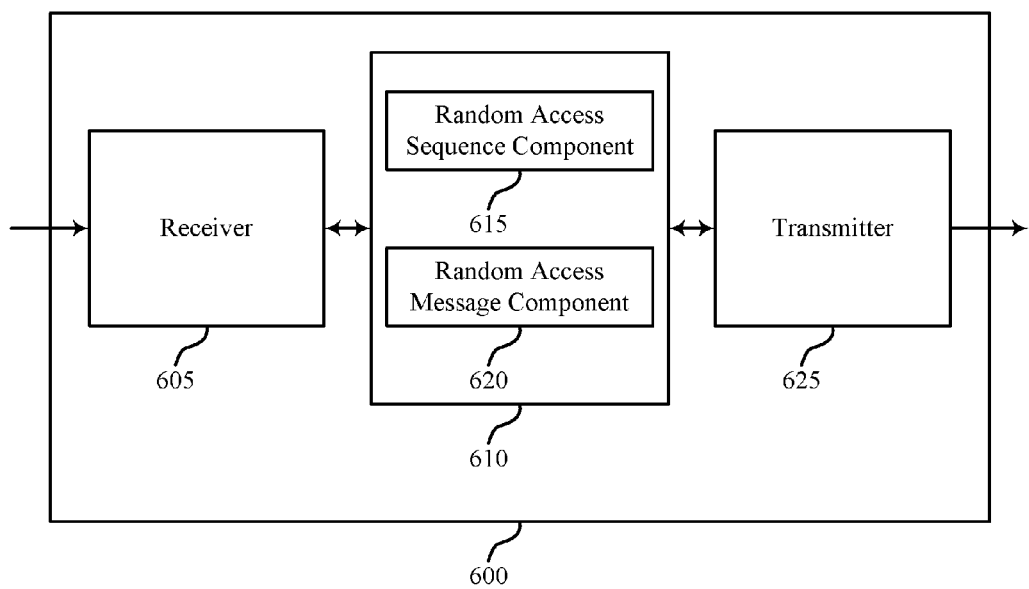

FIG. 6 shows a block diagram of a wireless device 600 that supports random access message transmission using multiple symbols in accordance with various aspects of the present disclosure. Wireless device 600 may be an example of aspects of a wireless device 500 or a UE 115 described with reference to FIGS. 1, 2 and 5. Wireless device 600 may include receiver 605, UE random access manager 610 and transmitter 625. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE random access manager 610 may be an example of aspects of UE random access manager 515 described with reference to FIG. 5. The UE random access manager 610 may include random access sequence component 615 and random access message component 620. The UE random access manager 610 may be an example of aspects of the UE random access manager 805 described with reference to FIG. 8. The random access sequence component 615 may identify a random access sequence and a spreading code. In some cases, the random access sequence includes a randomly selected cyclic shift of a predetermined access sequence.

The random access message component 620 may generate a random access message including a set of repetitions of the random access sequence weighted using different elements of the spreading code and spread over a set of symbols, and transmit the random access message to a wireless node. In some cases, each element of the spreading code includes a value of one or a value of negative one. For example, the first element of the spreading code and the second element of the spreading code are a value of one. In some cases, the first element of the spreading code is a value of one and the second element of the spreading code is a value of negative one.

In some cases, generating the random access message includes applying a randomly selected row of a Hadamard matrix as the spreading code. A length of the spreading code may correspond to a number of symbols used to transmit the random access message. In some cases, the random access message includes a CP based on a delay spread and a round trip time. In some cases, the random access message may be generated by including a first repetition of the random access sequence and a second repetition of the random access sequence.

The transmitter 625 may transmit signals received from other components of wireless device 600. In some examples, the transmitter 625 may be collocated with a receiver in a transceiver module. For example, the transmitter 625 may be an example of aspects of the transceiver 825 described with reference to FIG. 8. The transmitter 625 may utilize a single antenna, or it may utilize a plurality of antennas.

Figure 7:
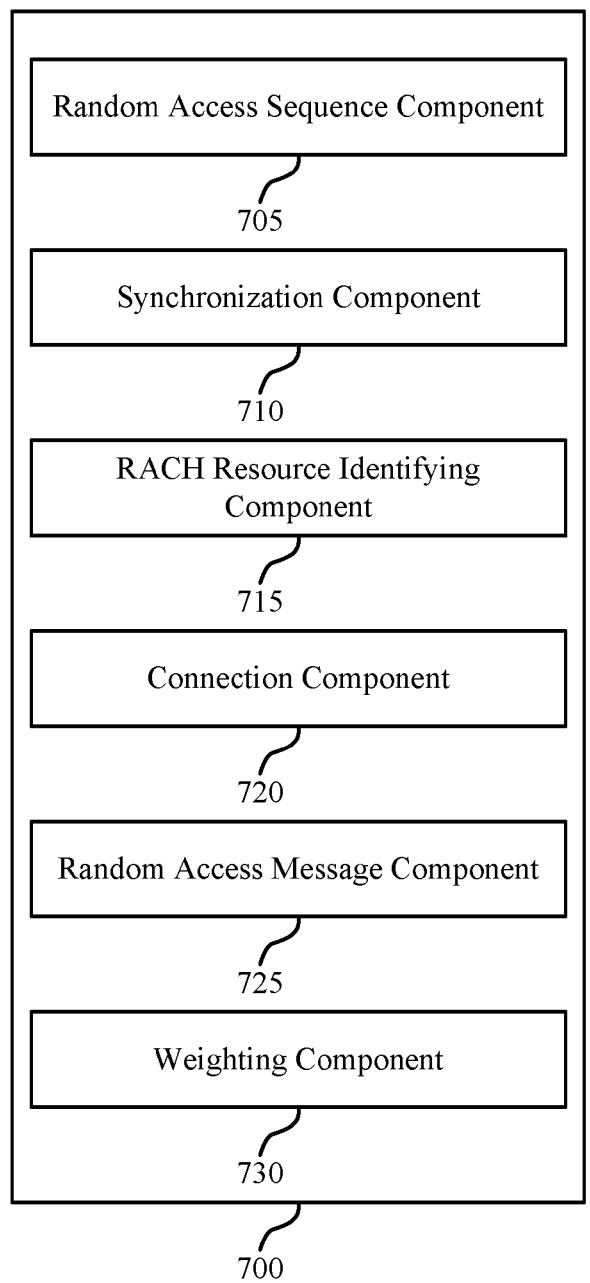

FIG. 7 shows a block diagram of a UE random access manager 700 which may be an example of the corresponding component of wireless device 500 or wireless device 600. That is, UE random access manager 700 may be an example of aspects of UE random access manager 515 or UE random access manager 610 described with reference to FIGS. 5 and 6. The UE random access manager 700 may also be an example of aspects of the UE random access manager 805 described with reference to FIG. 8.

The UE random access manager 700 may include random access sequence component 705, synchronization component 710, RACH resource identifying component 715, connection component 720, random access message component 725, and weighting component 730. Each of these modules may communicate, directly or indirectly, with one another (e.g., via one or more buses).

The random access sequence component 705 may identify a random access sequence and a spreading code. In some cases, the random access sequence includes a randomly selected cyclic shift of a predetermined access sequence. The synchronization component 710 may receive a synchronization subframe from a wireless node (e.g., a base station 105), where the synchronization subframe includes a directional transmission.

The RACH resource identifying component 715 may identify a frequency resource, a time resource, or both based on the received synchronization subframe, where a random access message may be transmitted using the frequency resource, the time resource, or both. In some cases, transmitting the random access message includes transmitting the random access message using one or more randomly selected subcarriers of a radio frequency spectrum band. In some cases, transmitting the random access message includes transmitting the random access message using one or more randomly selected component carriers. The connection component 720 may establish a wireless connection with the wireless node based on the random access message.

The random access message component 725 may generate a random access message including a set of repetitions of the random access sequence weighted using different elements of the spreading code and spread over a set of symbols, and transmit the random access message to a wireless node. The weighting component 730 may weight the first repetition of the random access sequence using a first element of the spreading code, and weight the second repetition of the random access sequence using a second element of the spreading code.

Figure 8:
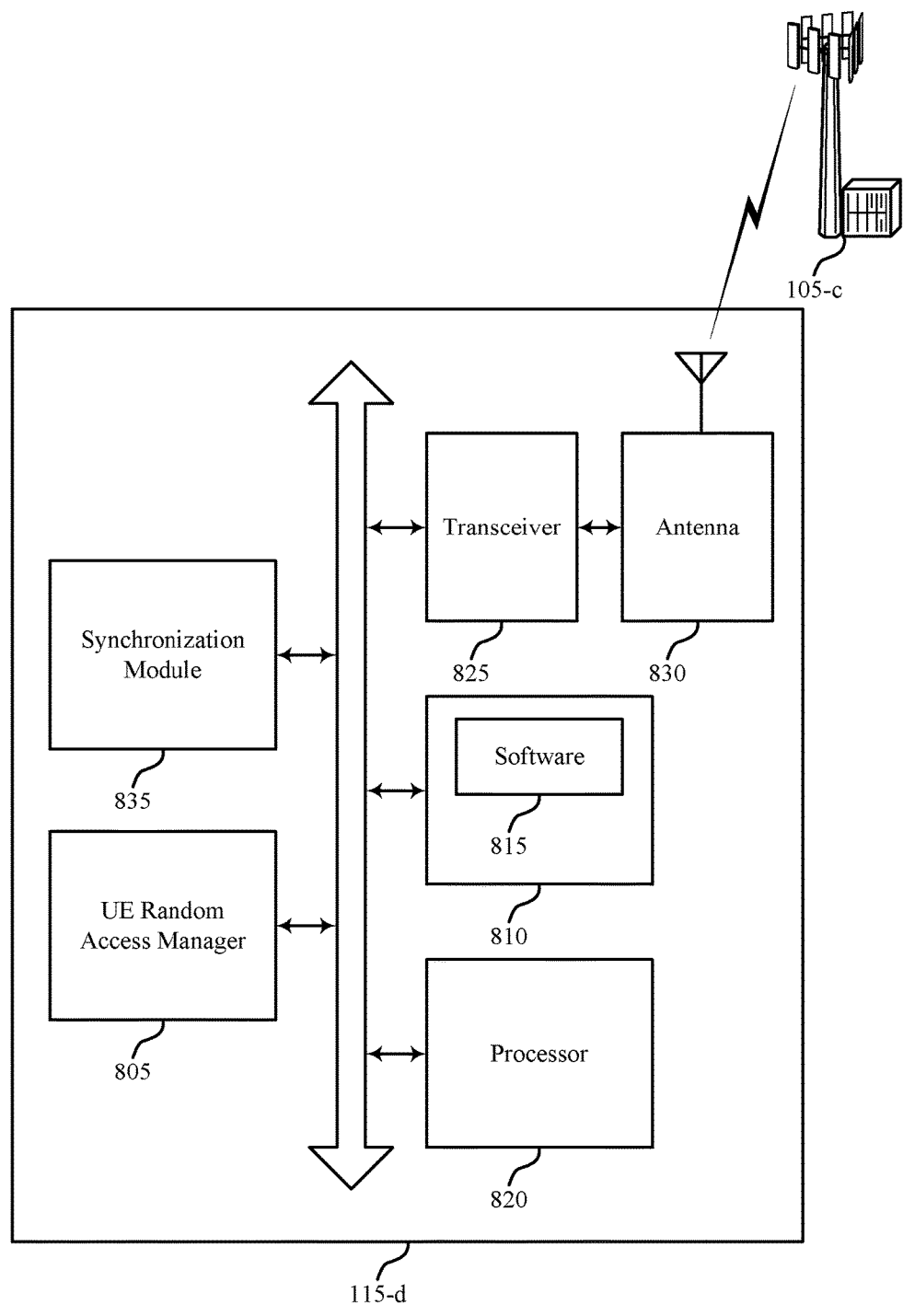
FIG. 8 illustrates a block diagram of a system including a device that supports random access message transmission using multiple symbols in accordance with aspects of the present disclosure.

FIG. 8 shows a diagram of a system 800 including a device that supports random access message transmission using multiple symbols in accordance with various aspects of the present disclosure. For example, system 800 may include UE 115-d, which may be an example of a wireless device 500, a wireless device 600, or a UE 115 as described with reference to FIGS. 1, 2, and 5 through 7.

UE 115-d may also include UE random access manager 805, memory 810, processor 820, transceiver 825, antenna 830, and synchronization module 835. Each of these modules may communicate, directly or indirectly, with one another (e.g., via one or more buses). The UE random access manager 805 may be an example of a UE random access manager 515, a UE random access manager 610, or a UE random access manager 700 as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., random access message transmission using multiple symbols, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.).

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

Synchronization module 835 may perform a synchronization procedure to determine timing and frequency information of an access network. For example, synchronization module 835 may perform one or more correlation procedures on received primary, secondary, or additional synchronization signals.

Figure 9:
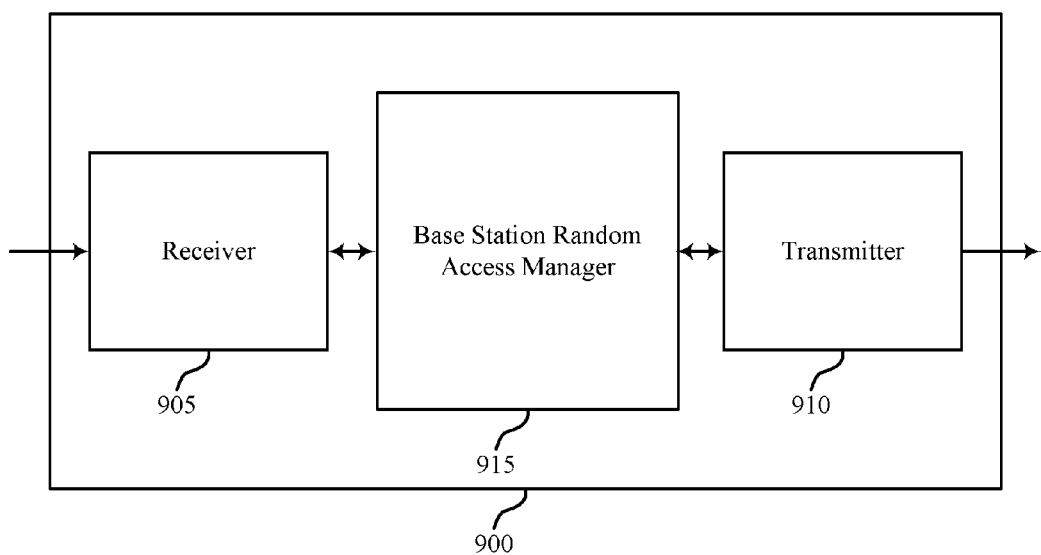
FIGS. 9 through 11 show block diagrams of a wireless device that supports random access message transmission using multiple symbols in accordance with aspects of the present disclosure.

FIG. 9 shows a block diagram of a wireless device 900 that supports random access message transmission using multiple symbols in accordance with various aspects of the present disclosure. Wireless device 900 may be an example of aspects of a wireless node or a base station 105 described with reference to FIGS. 1 and 2. Wireless device 900 may include receiver 905, transmitter 910, and base station random access manager 915. Wireless device 900 may also include a processor. Each of these components may be in communication with each other.

The receiver 905 may receive information such as packets, user data, or control information associated with various information channels (e.g., control channels, data channels, and information related to random access message transmissions using multiple symbols, etc.). Information may be passed on to other components of the device. The receiver 905 may be an example of aspects of the transceiver 1225 described with reference to FIG. 12.

The transmitter 910 may transmit signals received from other components of wireless device 900. In some examples, the transmitter 910 may be collocated with a receiver in a transceiver module. For example, the transmitter 910 may be an example of aspects of the transceiver 1225 described with reference to FIG. 12. The transmitter 910 may include a single antenna, or it may include a plurality of antennas.

The base station random access manager 915 may receive a random access message from a UE 115, where the random access message includes a set of repetitions of the random access sequence weighted using different elements of a spreading code and spread over a set of symbols. The base station random access manager 915 may also identify the random access sequence and the spreading code based on the random access message, and identify the UE 115 based on the random access sequence and the spreading code. The base station random access manager 915 may also be an example of aspects of the base station random access manager 1205 described with reference to FIG. 12.

Figure 10:
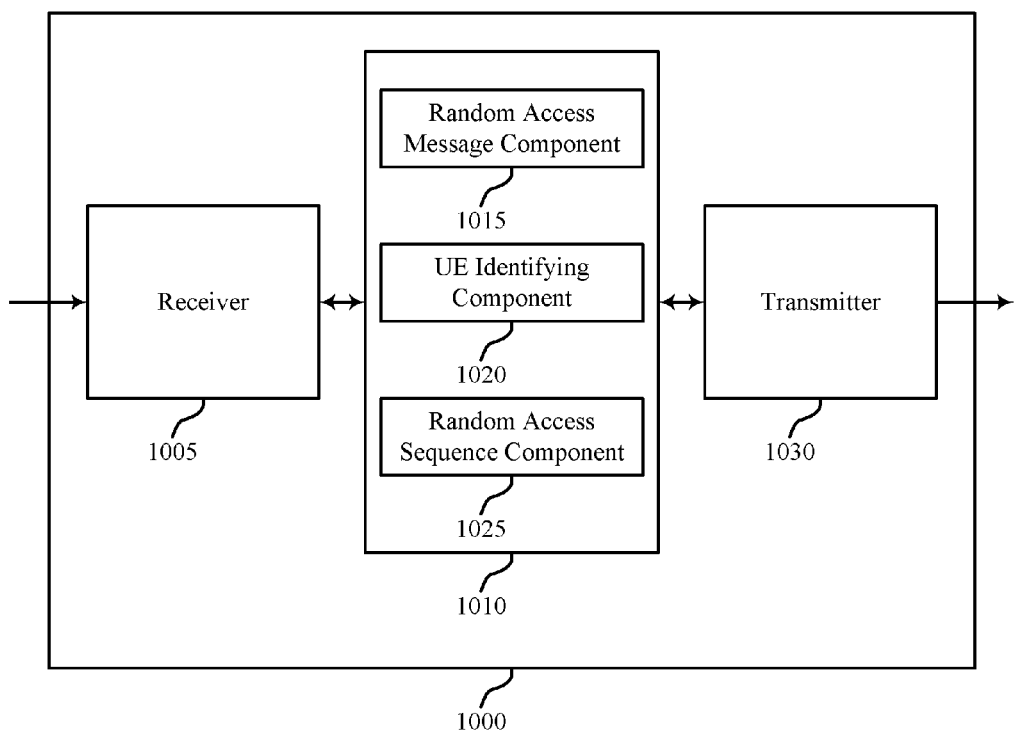

FIG. 10 shows a block diagram of a wireless device 1000 that supports random access message transmission using multiple symbols in accordance with various aspects of the present disclosure. Wireless device 1000 may be an example of aspects of a wireless device 900, a wireless node, or a base station 105 described with reference to FIGS. 1, 2, and 9. Wireless device 1000 may include receiver 1005, base station random access manager 1010, and transmitter 1030. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station random access manager 1010 may be an example of aspects of base station random access manager 915 described with reference to FIG. 9. The base station random access manager 1010 may include random access message component 1015, UE identifying component 1020, and random access sequence component 1025. The base station random access manager 1010 may be an example of aspects of the base station random access manager 1205 described with reference to FIG. 12.

The random access message component 1015 may receive a random access message from a UE, where the random access message includes a set of repetitions of the random access sequence weighted using different elements of a spreading code and spread over a set of symbols, and receive a second random access message from a second UE, where the second random access message includes repetitions of the random access sequence weighted using elements of a second spreading code different from the spreading code.

In some cases, receiving the random access message includes receiving a first repetition of the random access sequence and a second repetition of the random access sequence. In some cases, the first repetition of the random access sequence is weighted using a first element of the spreading code and the second repetition of the random access sequence is weighted using a second element of the spreading code. In some cases, the first element of the spreading code and the second element of the spreading code are a value of one. In some cases, the first element of the spreading code is a value of one and the second element of the spreading code is a value of negative one. In some cases, the spreading code includes a randomly selected row of a Hadamard matrix. In some cases, the length of the spreading code corresponds to a number of symbols used to transmit the random access message.

The UE identifying component 1020 may identify a UE 115 based on the random access sequence and the spreading code, and distinguish the UE 115 and a second UE 115 based on the spreading code being different from the second spreading code. The random access sequence component 1025 may identify the random access sequence and the spreading code based on the random access message.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or it may utilize a plurality of antennas.

Figure 11:
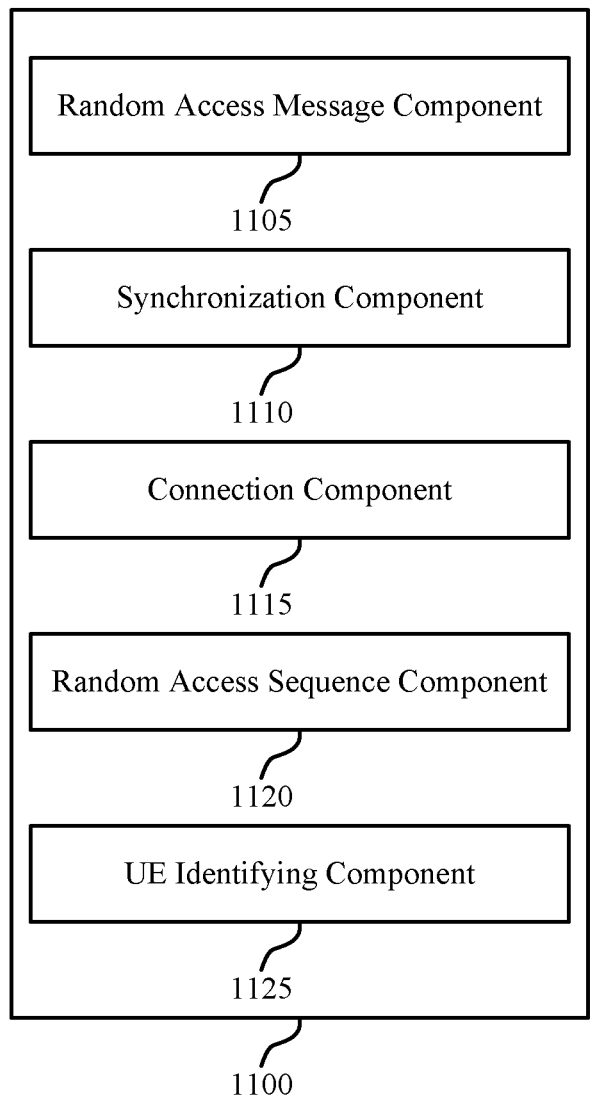

FIG. 11 shows a block diagram of a base station random access manager 1100 which may be an example of the corresponding component of wireless device 900 or wireless device 1000. That is, base station random access manager 1100 may be an example of aspects of base station random access manager 915 or base station random access manager 1010 described with reference to FIGS. 9 and 10. The base station random access manager 1100 may also be an example of aspects of the base station random access manager 1205 described with reference to FIG. 12.

The base station random access manager 1100 may include random access message component 1105, synchronization component 1110, connection component 1115, random access sequence component 1120, and UE identifying component 1125. Each of these modules may communicate, directly or indirectly, with one another (e.g., via one or more buses).

The random access message component 1105 may receive a random access message from a UE 115, where the random access message includes a set of repetitions of the random access sequence weighted using different elements of a spreading code and spread over a set of symbols, and receive a second random access message from a second UE 115, where the second random access message includes repetitions of the random access sequence weighted using elements of a second spreading code different from the spreading code. The synchronization component 1110 may transmit a synchronization subframe using a directional transmission, where the transmission of the random access message is based on the synchronization subframe. In some cases, the synchronization subframe is transmitted using a mmW frequency band.

The connection component 1115 may establish a wireless connection with the UE 115 based on the random access message. The random access sequence component 1120 may identify the random access sequence and the spreading code based on the random access message. The UE identifying component 1125 may identify the UE 115 based on the random access sequence and the spreading code, and distinguish the UE 115 and a second UE 115 based on the spreading code being different from the second spreading code.

Figure 12:
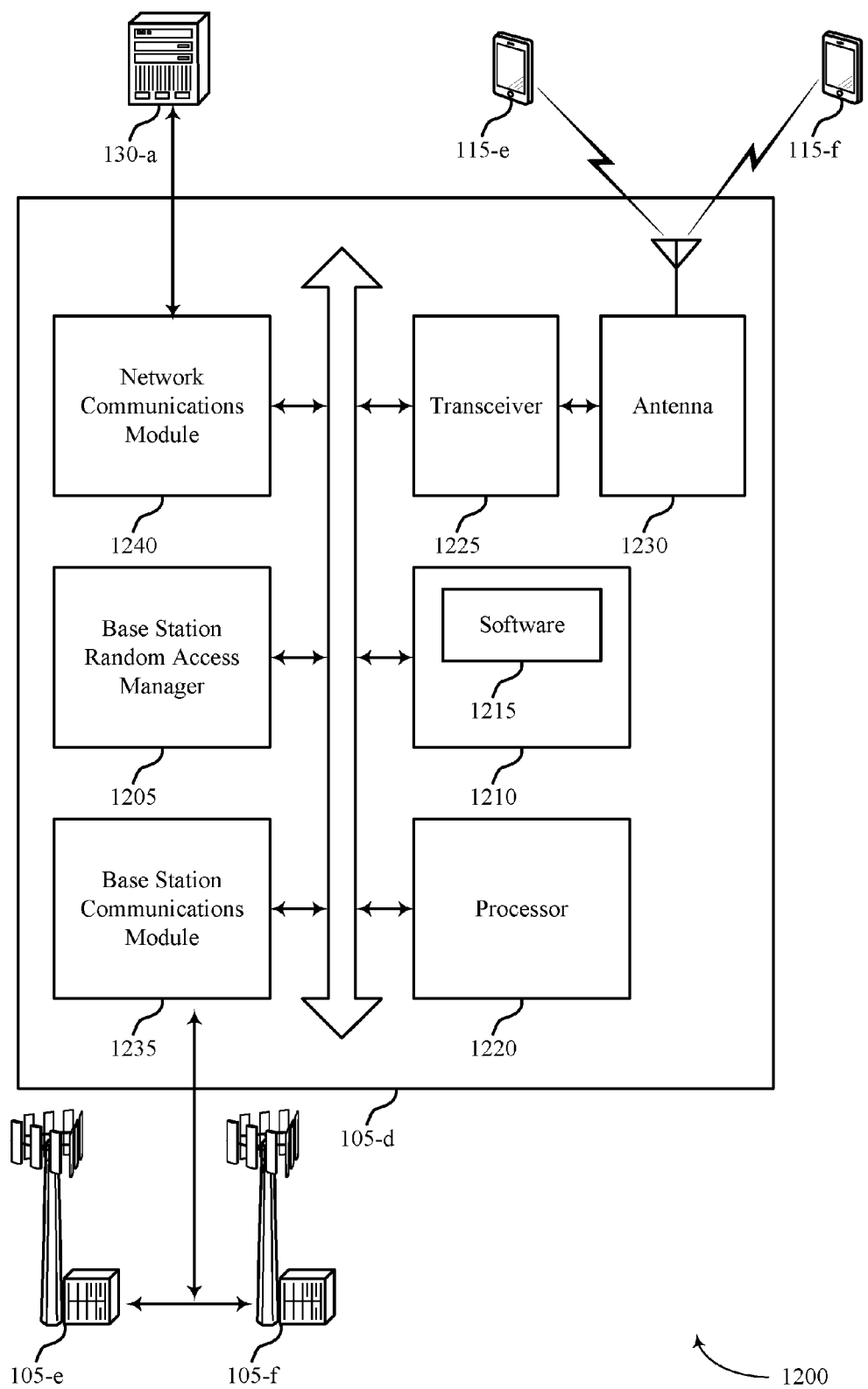
FIG. 12 illustrates a block diagram of a system including a device that supports random access message transmission using multiple symbols in accordance with aspects of the present disclosure.

FIG. 12 shows a diagram of a wireless system 1200 including a device configured to support random access message transmissions using multiple symbols in accordance with various aspects of the present disclosure. For example, wireless system 1200 may include base station 105-*d*, which may be an example of a wireless node, a wireless device 900, a wireless device 1000, or a base station 105 as described with reference to FIGS. 1, 2, and 9 through 11. Base station 105-*d* may also include components for bi-directional voice and data communications including components for transmitting communications and components for receiving communications. For example, base station 105-*d* may communicate bi-directionally with one or more UEs 115.

Base station 105-*d* may also include base station random access manager 1205, memory 1210, processor 1220, transceiver 1225, antenna 1230, base station communications module 1235, and network communications module 1240. Each of these modules may communicate, directly or indirectly, with one another (e.g., via one or more buses). The base station random access manager 1205 may be an example of a base station random access manager 915, a base station random access manager 1010, or a base station random access manager 1100 as described with reference to FIGS. 9 through 11.

The memory 1210 may include RAM and ROM. The memory 1210 may store computer-readable, computer-executable software including instructions that, when executed, cause the processor to perform various functions described herein (e.g., random access message transmission using multiple symbols, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1230, which may be capable of concurrently transmitting or receiving multiple wireless transmissions.

The base station communications module 1235 may manage communications with other base stations 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module 1235 may provide an X2 interface within a wireless communication network to provide communication between base stations 105.

The network communications module 1240 may manage communications with the core network 130-*a* (e.g., via one or more wired backhaul links). For example, the network communications module 1240 may manage the transfer of data communications for client devices, such as one or more UEs 115.

Figure 13:
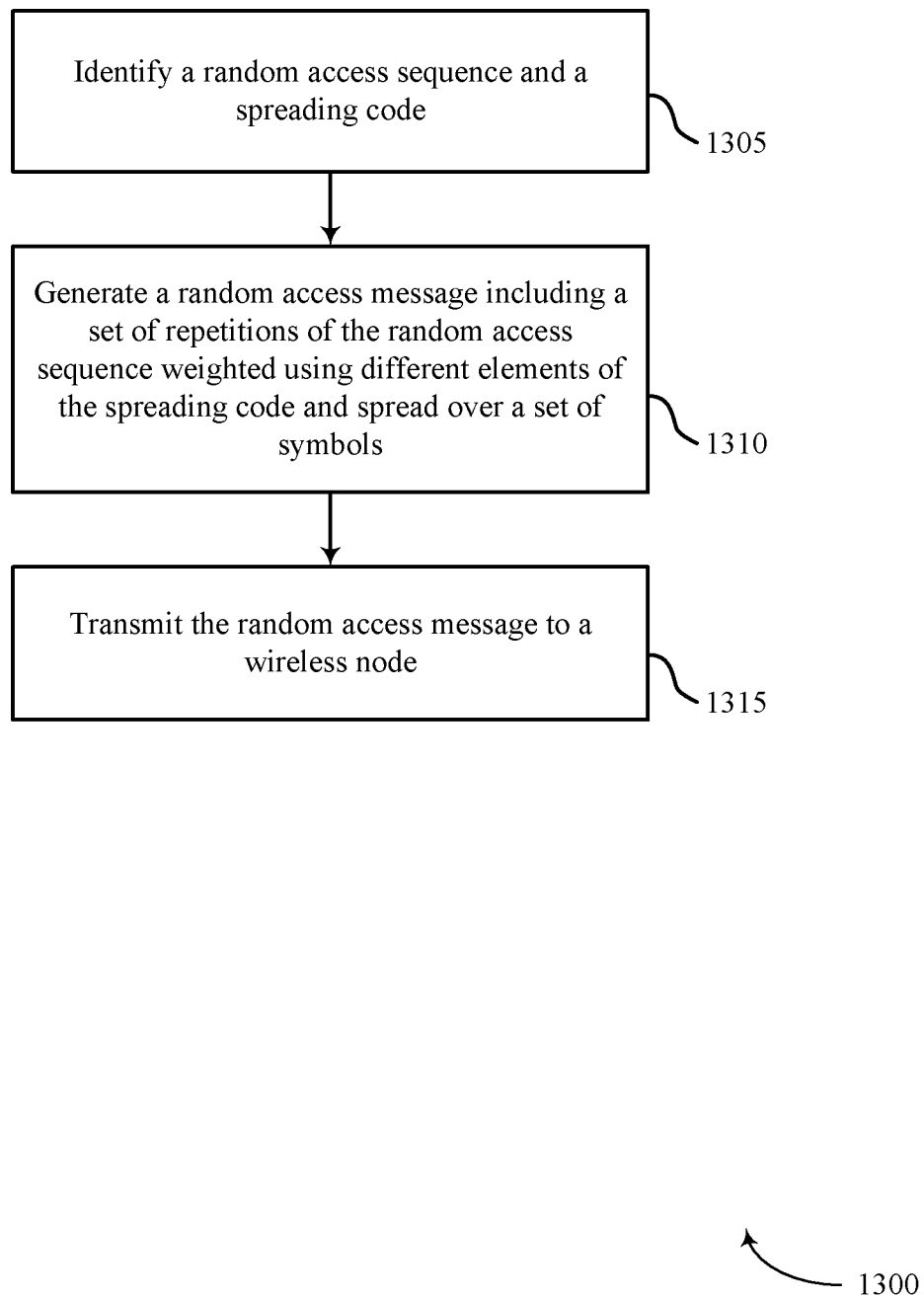
FIGS. 13 through 17 illustrate methods for random access message transmission using multiple symbols in accordance with aspects of the present disclosure.

FIG. 13 shows a flowchart illustrating a method 1300 for random access message transmission using multiple symbols in accordance with various aspects of the present disclosure. The operations of method 1300 may be implemented by a device such as a UE 115 or its components as described with reference to FIGS. 1 and 2. For example, the operations of method 1300 may be performed by the UE random access manager 515, the UE random access manager 610, the UE random access manager 700, or the UE random access manager 805 as described with reference to FIGS. 5, 6, 7, and 8, respectively. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may identify a random access sequence and a spreading code as described above with reference to FIGS. 2 through 4. In certain examples, the operations of block 1305 may be performed by the random access sequence component 615 or the random access sequence component 705 as described with reference to FIGS. 6 and 7.

At block 1310, the UE 115 may generate a random access message including a set of repetitions of the random access sequence weighted using different elements of the spreading code and spread over a set of symbols as described above with reference to FIGS. 2 through 4. In certain examples, the operations of block 1310 may be performed by the random access message component 620 or the random access message component 725 as described with reference to FIGS. 6 and 7.

At block 1315, the UE 115 may transmit the random access message to a wireless node as described above with reference to FIGS. 2 through 4. In certain examples, the operations of block 1315 may be performed by the random access message component 620 or the random access message component 725 as described with reference to FIGS. 6 and 7.

Figure 14:
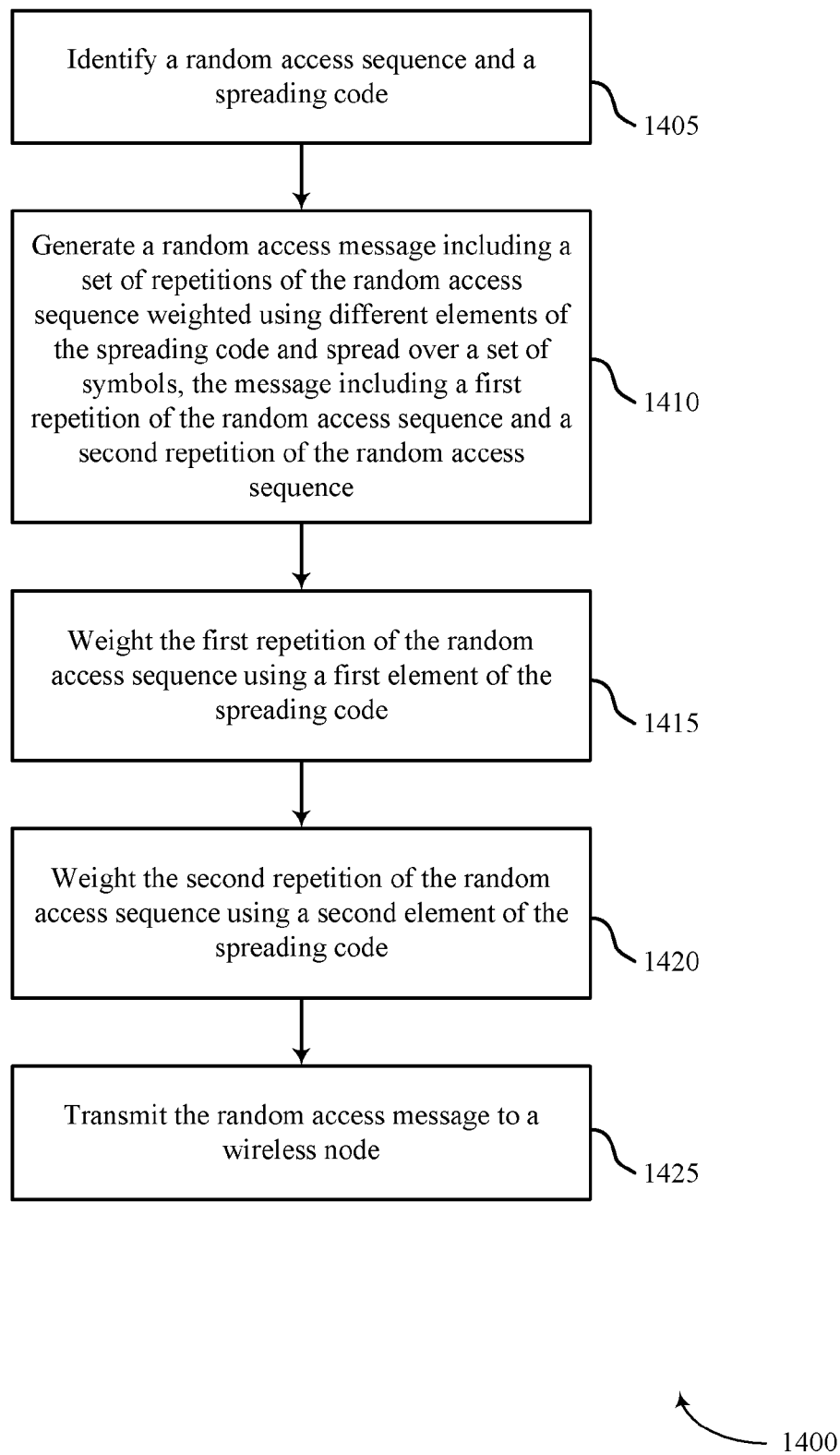

FIG. 14 shows a flowchart illustrating a method 1400 for random access message transmission using multiple symbols in accordance with various aspects of the present disclosure. The operations of method 1400 may be implemented by a device such as a UE 115 or its components as described with reference to FIGS. 1 and 2. For example, the operations of method 1400 may be performed by the UE random access manager 515, the UE random access manager 610, the UE random access manager 700, or the UE random access manager 805 as described with reference to FIGS. 5, 6, 7, and 8, respectively. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may identify a random access sequence and a spreading code as described above with reference to FIGS. 2 through 4. In certain examples, the operations of block 1405 may be performed by the random access sequence component 615 or the random access sequence component 705 as described with reference to FIGS. 6 and 7.

At block 1410, the UE 115 may generate a random access message including a set of repetitions of the random access sequence weighted using different elements of the spreading code and spread over a set of symbols as described above with reference to FIGS. 2 through 4. In some cases, generating the random access message includes including a first repetition of the random access sequence and a second repetition of the random access sequence. In certain examples, the operations of block 1410 may be performed by the random access message component 620 or the random access message component 725 as described with reference to FIGS. 6 and 7.

At block 1415, the UE 115 may weight the first repetition of the random access sequence using a first element of the spreading code as described above with reference to FIGS. 2 through 4. In certain examples, the operations of block 1415 may be performed by the weighting component 730 as described with reference to FIG. 7.

At block 1420, the UE 115 may weight the second repetition of the random access sequence using a second element of the spreading code as described above with reference to FIGS. 2 through 4. In certain examples, the operations of block 1420 may be performed by the weighting component 730 as described with reference to FIG. 7.

At block 1425, the UE 115 may transmit the random access message to a wireless node as described above with reference to FIGS. 2 through 4. In certain examples, the operations of block 1425 may be performed by the random access message component 620 or the random access message component 725 as described with reference to FIGS. 6 and 7.

Figure 15:
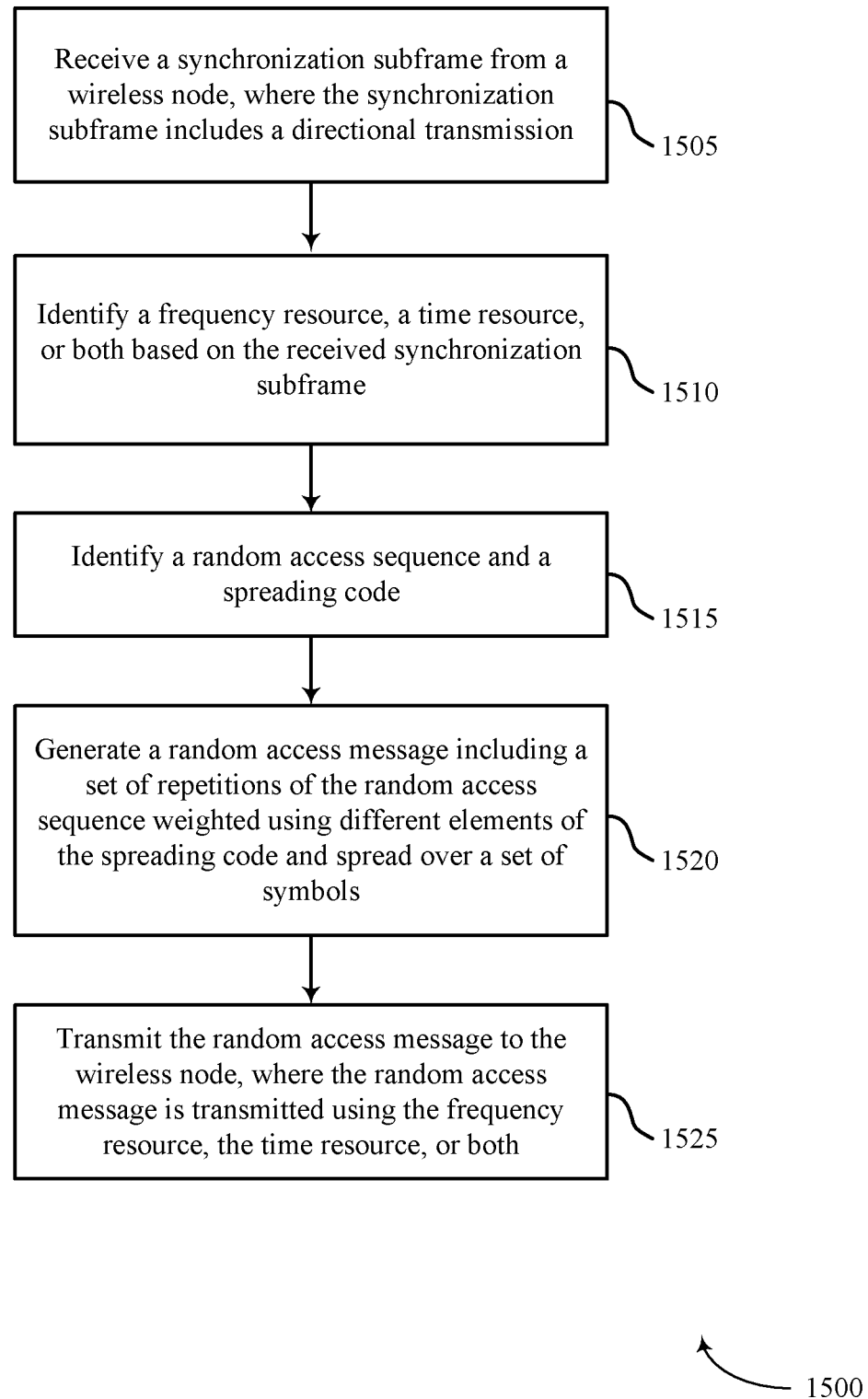

FIG. 15 shows a flowchart illustrating a method 1500 for random access message transmission using multiple symbols in accordance with various aspects of the present disclosure. The operations of method 1500 may be implemented by a device such as a UE 115 or its components as described with reference to FIGS. 1 and 2. For example, the operations of method 1500 may be performed by the UE random access manager 515, the UE random access manager 610, the UE random access manager 700, or the UE random access manager 805 as described with reference to FIGS. 5, 6, 7, and 8, respectively. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive a synchronization subframe from a wireless node, where the synchronization subframe includes a directional transmission as described above with reference to FIGS. 2 through 4. In certain examples, the operations of block 1505 may be performed by the synchronization component 710 as described with reference to FIG. 7.

At block 1510, the UE 115 may identify a frequency resource, a time resource, or both based on the received synchronization subframe as described above with reference to FIGS. 2 through 4. In certain examples, the operations of block 1510 may be performed by the RACH resource identifying component 715 as described with reference to FIG. 7.

At block 1515, the UE 115 may identify a random access sequence and a spreading code as described above with reference to FIGS. 2 through 4. In certain examples, the operations of block 1515 may be performed by the random access sequence component 615 or the random access sequence component 705 as described with reference to FIGS. 6 and 7.

At block 1520, the UE 115 may generate a random access message including a set of repetitions of the random access sequence weighted using different elements of the spreading code and spread over a set of symbols as described above with reference to FIGS. 2 through 4. In certain examples, the operations of block 1520 may be performed by the random access message component 620 or the random access message component 725 as described with reference to FIGS. 6 and 7.

At block 1525, the UE 115 may transmit the random access message to the wireless node, where the random access message is transmitted using the frequency resource, the time resource, or both as described above with reference to FIGS. 2 through 4. In certain examples, the operations of block 1525 may be performed by the random access message component 620 or the random access message component 725 as described with reference to FIGS. 6 and 7.

Figure 16:
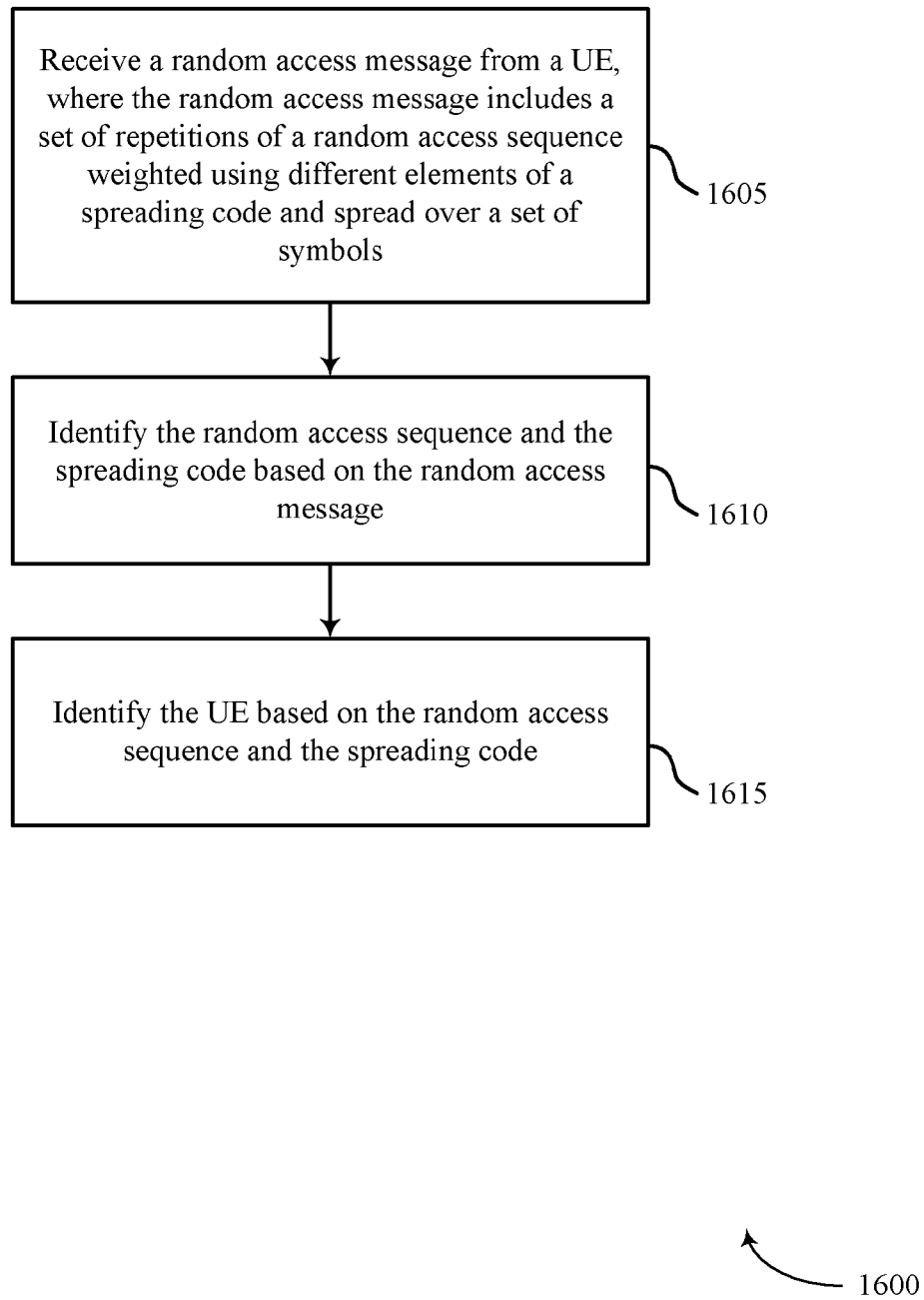

FIG. 16 shows a flowchart illustrating a method 1600 for random access message transmission using multiple symbols in accordance with various aspects of the present disclosure. The operations of method 1600 may be implemented by a device such as a wireless node, such as a base station 105, or its components as described with reference to FIGS. 1 and 2. For example, the operations of method 1600 may be performed by the base station random access manager 915, the base station random access manager 1010, the base station random access manager 1100, or the base station random access manager 1205 as described with reference to FIGS. 9, 10, 11, and 12, respectively. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may receive a random access message from a UE 115, where the random access message includes a set of repetitions of the random access sequence weighted using different elements of a spreading code and spread over a set of symbols as described above with reference to FIGS. 2 through 4. In certain examples, the operations of block 1605 may be performed by the random access message component 1015 or the random access message component 1105 as described with reference to FIGS. 10 and 11.

At block 1610, the base station 105 may identify the random access sequence and a spreading code based on the random access message as described above with reference to FIGS. 2 through 4. In certain examples, the operations of block 1610 may be performed by the random access sequence component 1025 or the random access sequence component 1120 as described with reference to FIGS. 10 and 11.

At block 1615, the base station 105 may identify the UE based on the random access sequence and the spreading code as described above with reference to FIGS. 2 through 4. In certain examples, the operations of block 1615 may be performed by the UE identifying component 1020 or the UE identifying component 1125 as described with reference to FIGS. 10 and 11.

Figure 17:
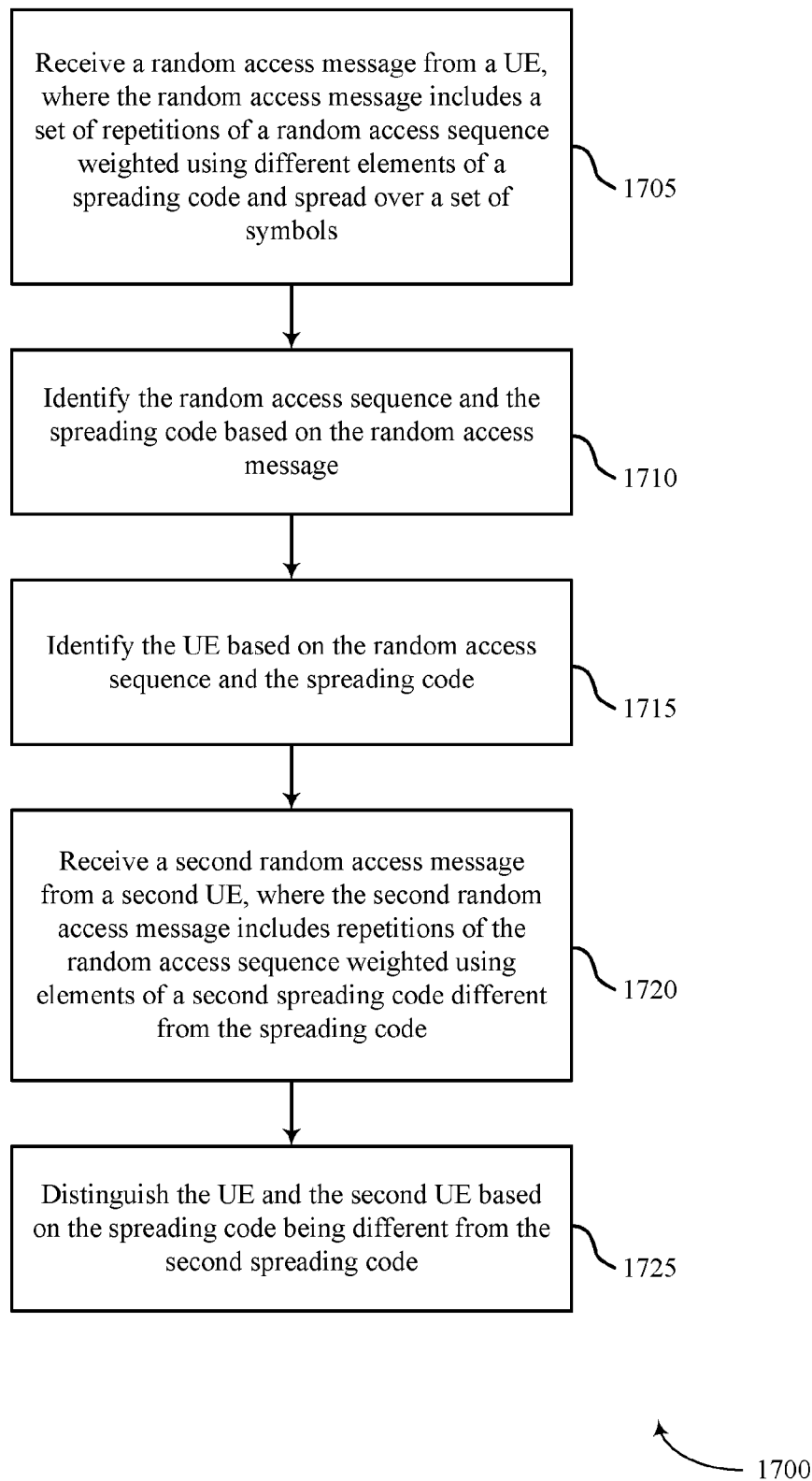

FIG. 17 shows a flowchart illustrating a method 1700 for random access message transmission using multiple symbols in accordance with various aspects of the present disclosure. The operations of method 1700 may be implemented by a device such as a base station 105 or its components as described with reference to FIGS. 1 and 2. For example, the operations of method 1700 may be performed by the base station random access manager 915, the base station random access manager 1010, the base station random access manager 1100, or the base station random access manager 1205 as described with reference to FIGS. 9, 10, 11, and 12, respectively. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may receive a random access message from a UE 115, where the random access message includes a set of repetitions of a random access sequence weighted using different elements of a spreading code and spread over a set of symbols as described above with reference to FIGS. 2 through 4. In certain examples, the operations of block 1705 may be performed by the random access message component 1015 or the random access message component 1105 as described with reference to FIGS. 10 and 11.

At block 1710, the base station 105 may identify the random access sequence and the spreading code based on the random access message as described above with reference to FIGS. 2 through 4. In certain examples, the operations of block 1710 may be performed by the random access sequence component 1025 or the random access sequence component 1120 as described with reference to FIGS. 10 and 11.

At block 1715, the base station 105 may identify the UE 115 based on the random access sequence and the spreading code as described above with reference to FIGS. 2 through 4. In certain examples, the operations of block 1715 may be performed by the UE identifying component 1020 or the UE identifying component 1125 as described with reference to FIGS. 10 and 11.

At block 1720, the base station 105 may receive a second random access message from a second UE, where the second random access message includes repetitions of the random access sequence weighted using elements of a second spreading code different from the spreading code as described above with reference to FIGS. 2 through 4. In certain examples, the operations of block 1720 may be performed by the random access message component 1015 or the random access message component 1105 as described with reference to FIGS. 10 and 11.

At block 1725, the base station 105 may distinguish the UE 115 and the second UE 115 based on the spreading code being different from the second spreading code as described above with reference to FIGS. 2 through 4. In certain examples, the operations of block 1725 may be performed by the UE identifying component 1020 or the UE identifying component 1125 as described with reference to FIGS. 10 and 11.

It should be noted that the methods 1300, 1400, 1500, 1600, and 1700 describe possible implementation, and that the operations and the steps may be rearranged or otherwise modified such that other implementations are possible. In some examples, aspects from two or more of the methods 1300, 1400, 1500, 1600, and 1700 as described with reference to FIGS. 13, 14, 15, 16, and 17 may be combined. For example, aspects of each of the methods 1300, 1400, 1500, 1600, and 1700 may include steps or aspects of the other methods, or other steps or techniques described herein. Thus, aspects of the disclosure may provide for random access message transmission using multiple symbols.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In some networks, including networks described herein or LTE/LTE-A networks, the term eNB may be generally used to describe the base stations. The wireless communications system or systems described herein may include a heterogeneous network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for random access message transmission using multiple symbols. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
   identifying a random access sequence and a spreading code, wherein a length of the spreading code corresponds to a number of symbols used to transmit a random access message;
   generating the random access message comprising a first repetition of the random access sequence weighted using a first element of the spreading code for transmission in a first symbol and a second repetition of the random access sequence weighted using a second element of the spreading code for transmission in a second symbol, wherein one or more subcarriers of a radio frequency spectrum band for the first repetition in the first symbol are a same one or more subcarriers for the second repetition in the second symbol; and
   transmitting the random access message to a wireless node.

2. The method of claim 1, wherein the first element of the spreading code and the second element of the spreading code are a value of one.

3. The method of claim 1, wherein the first element of the spreading code is a value of one and the second element of the spreading code is a value of negative one.

4. The method of claim 1, wherein each element of the spreading code comprises a value of one or a value of negative one.

5. The method of claim 1, wherein generating the random access message comprises:
   applying a randomly selected row of a Hadamard matrix as the spreading code.

6. The method of claim 1, further comprising:
   receiving a synchronization subframe from the wireless node, wherein the synchronization subframe comprises a directional transmission; and
   identifying the first and second symbols as a time resource based at least in part on the received synchronization subframe.

7. The method of claim 1, further comprising:
   establishing a wireless connection with the wireless node based at least in part on the random access message.

8. The method of claim 1, wherein
   the one or more subcarriers of the radio frequency spectrum band are randomly selected.

9. The method of claim 1, wherein transmitting the random access message comprises:
   transmitting the random access message using one or more randomly selected component carriers.

10. The method of claim 1, wherein the random access message comprises a cyclic prefix based on a delay spread and a round trip time.

11. The method of claim 1, wherein the random access sequence comprises a randomly selected cyclic shift of a predetermined access sequence.

12. A method of wireless communication comprising:
receiving a random access message from a user equipment (UE), wherein the random access message comprises a first repetition of a random access sequence weighted using a first element of a spreading code for transmission in a first symbol and a second repetition of the random access sequence weighted using a second element of the spreading code for transmission in a second symbol, wherein one or more subcarriers of a radio frequency spectrum band for the first repetition in the first symbol are a same one or more subcarriers for the second repetition in the second symbol;
identifying the random access sequence and the spreading code based at least in part on the random access message, wherein a length of the spreading code corresponds to a number of symbols used to transmit the random access message; and
identifying the UE based at least in part on the random access sequence and the spreading code.

13. The method of claim 12, wherein the first element of the spreading code and the second element of the spreading code are a value of one.

14. The method of claim 12, wherein the first element of the spreading code is a value of one and the second element of the spreading code is a value of negative one.

15. The method of claim 12, wherein the spreading code comprises a randomly selected row of a Hadamard matrix.

16. The method of claim 12, further comprising:
transmitting a synchronization subframe using a directional transmission, wherein a time resource for the first and second symbols of the random access message is based at least in part on the synchronization subframe.

17. The method of claim 16, wherein the synchronization subframe is transmitted using a millimeter wave (mmW) frequency band.

18. The method of claim 12, further comprising:
establishing a wireless connection with the UE based at least in part on the random access message.

19. The method of claim 12, further comprising:
receiving a second random access message from a second UE, wherein the second random access message comprises repetitions of the random access sequence weighted using elements of a second spreading code different from the spreading code; and
distinguishing the UE and the second UE based at least in part on the spreading code being different from the second spreading code.

20. An apparatus for wireless communication comprising:
means for identifying a random access sequence and a spreading code, wherein a length of the spreading code corresponds to a number of symbols used to transmit a random access message;
means for generating the random access message comprising a first repetition of the random access sequence weighted using a first element of the spreading code for transmission in a first symbol and a second repetition of the random access sequence weighted using a second element of the spreading code for transmission in a second symbol, wherein one or more subcarriers of a radio frequency spectrum band for the first repetition in the first symbol are a same one or more subcarriers for the second repetition in the second symbol; and
means for transmitting the random access message to a wireless node.

21. The apparatus of claim 20, wherein the first element of the spreading code and the second element of the spreading code are a value of one.

22. The apparatus of claim 20, wherein the first element of the spreading code is a value of one and the second element of the spreading code is a value of negative one.

23. The apparatus of claim 20, wherein each element of the spreading code comprises a value of one or a value of negative one.

24. An apparatus for wireless communication comprising:
means for receiving a random access message from a user equipment (UE), wherein the random access message comprises a first repetition of a random access sequence weighted using a first element of a spreading code for transmission in a first symbol and a second repetition of the random access sequence weighted using a second element of the spreading code for transmission in a second symbol, wherein one or more subcarriers of a radio frequency spectrum band for the first repetition in the first symbol are a same one or more subcarriers for the second repetition in the second symbol;
means for identifying the random access sequence and the spreading code based at least in part on the random access message, wherein a length of the spreading code corresponds to a number of symbols used to transmit the random access message; and
means for identifying the UE based at least in part on the random access sequence and the spreading code.

25. The apparatus of claim 24, wherein the first element of the spreading code and the second element of the spreading code are a value of one.

26. The apparatus of claim 24, wherein the first element of the spreading code is a value of one and the second element of the spreading code is a value of negative one.

27. An apparatus for wireless communication, comprising:
a processor;
memory in electronic communication with the processor; and
instructions stored in the memory and operable, when executed by the processor, to cause the apparatus to:
identify a random access sequence and a spreading code, wherein a length of the spreading code corresponds to a number of symbols used to transmit a random access message;
generate the random access message comprising a first repetition of the random access sequence weighted using a first element of the spreading code for transmission in a first symbol and a second repetition of the random access sequence weighted using a second element of the spreading code for transmission in a second symbol, wherein one or more subcarriers of a radio frequency spectrum band for the first repetition in the first symbol are a same one or more subcarriers for the second repetition in the second symbol; and
transmit the random access message to a wireless node.

28. The apparatus of claim 27, wherein the first element of the spreading code and the second element of the spreading code are a value of one.

29. The apparatus of claim 27, wherein the first element of the spreading code is a value of one and the second element of the spreading code is a value of negative one.

30. The apparatus of claim 27, wherein each element of the spreading code comprises a value of one or a value of negative one.

31. The apparatus of claim 27, wherein the instructions operable to cause the processor to generate the random access message comprise instructions operable to cause the processor to:
apply a randomly selected row of a Hadamard matrix as the spreading code.

32. The apparatus of claim 27, wherein the instructions are operable to cause the processor to:
receive a synchronization subframe from the wireless node, wherein the synchronization subframe comprises a directional transmission; and
identify the first and second symbols as a time resource based at least in part on the received synchronization subframe.

33. The apparatus of claim 27, wherein the instructions are operable to cause the processor to:
establish a wireless connection with the wireless node based at least in part on the random access message.

34. The apparatus of claim 27, wherein
the one or more subcarriers of the radio frequency spectrum band are randomly selected.

35. The apparatus of claim 27, wherein the instructions operable to cause the processor to transmit the random access message comprise instructions operable to cause the processor to:
transmit the random access message using one or more randomly selected component carriers.

36. The apparatus of claim 27, wherein the random access message comprises a cyclic prefix based on a delay spread and a round trip time.

37. The apparatus of claim 27, wherein the random access sequence comprises a randomly selected cyclic shift of a predetermined access sequence.

38. An apparatus for wireless communication, comprising:
a processor;
memory in electronic communication with the processor; and
instructions stored in the memory and operable, when executed by the processor, to cause the apparatus to:
receive a random access message from a user equipment (UE), wherein the random access message comprises a first repetition of a random access sequence weighted using a first element of a spreading code for transmission in a first symbol and a second repetition of the random access sequence weighted using a second element of the spreading code for transmission in a second symbol, wherein one or more subcarriers of a radio frequency spectrum band for the first repetition in the first symbol are a same one or more subcarriers for the second repetition in the second symbol;
identify the random access sequence and the spreading code based at least in part on the random access message, wherein a length of the spreading code corresponds to a number of symbols used to transmit the random access message; and
identify the UE based at least in part on the random access sequence and the spreading code.

39. The apparatus of claim 38, wherein the first element of the spreading code and the second element of the spreading code are a value of one.

40. The apparatus of claim 38, wherein the first element of the spreading code is a value of one and the second element of the spreading code is a value of negative one.

41. The apparatus of claim 38, wherein the spreading code comprises a randomly selected row of a Hadamard matrix.

42. The apparatus of claim 38, wherein the instructions are operable to cause the processor to:
transmit a synchronization subframe using a directional transmission, wherein a time resource for the first and second symbols of the random access message is based at least in part on the synchronization subframe.

43. The apparatus of claim 42, wherein the synchronization subframe is transmitted using a millimeter wave (mmW) frequency band.

44. The apparatus of claim 38, wherein the instructions are operable to cause the processor to:
establish a wireless connection with the UE based at least in part on the random access message.

45. The apparatus of claim 38, wherein the instructions are operable to cause the processor to:
receive a second random access message from a second UE, wherein the second random access message comprises repetitions of the random access sequence weighted using elements of a second spreading code different from the spreading code; and
distinguish the UE and the second UE based at least in part on the spreading code being different from the second spreading code.

46. A non-transitory computer-readable medium storing code for wireless communication, the code comprising instructions executable to:
identify a random access sequence and a spreading code, wherein a length of the spreading code corresponds to a number of symbols used to transmit a random access message;
generate the random access message comprising a first repetition of the random access sequence weighted using a first element of the spreading code for transmission in a first symbol and a second repetition of the random access sequence weighted using a second element of the spreading code for transmission in a second symbol, wherein one or more subcarriers of a radio frequency spectrum band for the first repetition in the first symbol are a same one or more subcarriers for the second repetition in the second symbol; and
transmit the random access message to a wireless node.

47. A non-transitory computer-readable medium storing code for wireless communication, the code comprising instructions executable to:
receive a random access message from a user equipment (UE), wherein the random access message comprises a first repetition of a random access sequence weighted using a first element of a spreading code for transmission in a first symbol and a second repetition of the random access sequence weighted using a second element of the spreading code for transmission in a second symbol, wherein one or more subcarriers of a radio frequency spectrum band for the first repetition in the first symbol are a same one or more subcarriers for the second repetition in the second symbol;
identify the random access sequence and the spreading code based at least in part on the random access message, wherein a length of the spreading code corresponds to a number of symbols used to transmit the random access message; and
identify the UE based at least in part on the random access sequence and the spreading code.

* * * * *